(12) United States Patent
Jia et al.

(10) Patent No.: US 11,871,374 B2
(45) Date of Patent: Jan. 9, 2024

(54) METHOD AND APPARATUS FOR CONFIGURING AND DETERMINING PAGING OPPORTUNITIES AND SYSTEM

(71) Applicant: FUJITSU LIMITED, Kawasaki (JP)

(72) Inventors: Meiyi Jia, Beijing (CN); Qinyan Jiang, Beijing (CN); Lei Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 171 days.

(21) Appl. No.: 17/363,485

(22) Filed: Jun. 30, 2021

(65) Prior Publication Data
US 2021/0329588 A1    Oct. 21, 2021

Related U.S. Application Data

(63) Continuation of application No. PCT/CN2019/071239, filed on Jan. 10, 2019.

(51) Int. Cl.
*H04W 68/00* (2009.01)

(52) U.S. Cl.
CPC .................. *H04W 68/00* (2013.01)

(58) Field of Classification Search
CPC .................................................. H04W 68/00
USPC ....................................................... 455/458
See application file for complete search history.

(56) References Cited

U.S. PATENT DOCUMENTS

| | | |
|---|---|---|
| 2017/0359747 A1 | 12/2017 | Lunden et al. |
| 2019/0313461 A1* | 10/2019 | Jung .................. H04W 72/046 |
| 2020/0099491 A1* | 3/2020 | Qin ..................... H04B 7/0695 |

FOREIGN PATENT DOCUMENTS

| | | |
|---|---|---|
| CN | 102625254 A | 8/2012 |
| CN | 102811192 A | 12/2012 |
| CN | 104812032 A | 7/2015 |
| CN | 106961729 A | 7/2017 |
| WO | 2017/121197 A1 | 7/2017 |
| WO | 2018/228287 A1 | 12/2018 |

OTHER PUBLICATIONS

Notice of Reasons for Refusal issued by the Japan Patent Office for corresponding Japanese Patent Application No. 2021-540048, dated Jul. 5, 2022, with an English translation.
Ericsson, "Configuration of POs within a PF", Agenda Item: 10.4.5.3, 3GPP TSG-RAN WG2 Meeting #103, R2-1812285, Update of R2-1809723, Gothenburg, Sweden, Aug. 20-24, 2018.
Vivo, "Discussion on RAN1 LS for clarification of PF and PO configuration", Agenda Item: 10.4.5.3, 3GPP TSG-RAN WG2 Meeting #103bis, R2-1814186, Chengdu, China, Oct. 8-12, 2018.
Examination Report issued by the Indian Patent Office for corresponding Indian patent application No. 202137029097, dated Mar. 8, 2022, with English translation.

(Continued)

*Primary Examiner* — Ted M Wang
(74) *Attorney, Agent, or Firm* — Myers Wolin, LLC

(57) ABSTRACT

A method and apparatus for configuring and determining paging opportunities and a system, in which by increasing transmission opportunities of paging, such as increasing total paging opportunities or increasing paging opportunities for paging a specific terminal, a network device may be ensured to find terminal equipment or punctually notify the terminal equipment of update of system information and transfer of public warning system (PWS) information.

19 Claims, 16 Drawing Sheets

---

401
the network device generates first configuration information, the first configuration information including first parameter(s) associated with paging occasion(s), and the number of the paging occasion(s) associated with the first parameter(s) being greater than 4 and being an integral multiple of 4

402
the network device transmits the first configuration information to a terminal equipment

(56) References Cited

OTHER PUBLICATIONS

Communication pursuant to Rule 164(1) EPC, with the partial supplementary European Search Report issued by the European Patent Office for corresponding European Patent Application No. 19909588.6-1212, dated Feb. 3, 2022.
Intel Corporation, "Paging enhancement for NR-U", Agenda Item: 11.2.2.1, 3GPP TSG-RAN WG2 Meeting #104, R2-1816706, Spokane, USA, Nov. 12-16, 2018.
Intel Corporation, "Paging enhancement for NR-U", Agenda Item: 11.2, 3GPP TSG-RAN WG2 AH-1807, R2-1809805, Montreal, Canada, Jul. 2-6, 2018.
LG Electronics Inc, "Paging enhancements in NR Unlicensed band", Agenda item: 11.2.2.1 Inactive and Idle mode, 3GPP TSG-RAN WG2 Meeting #104, R2-1816446, Spokane, USA, Nov. 12-16, 2018.
Samsung, "Remaining Issues for PO Determination", Agenda item: 10.4.5.5, 3GPP TSG-RAN2 Adhoc, R2-1809477, Montreal, Canada, Jul. 2-6, 2018.
Fujitsu, "Additional paging opportunities for NR-U", Agenda Item: 11.2.2.1, 3GPP TSG-RAN WG2 Meeting #107, R2-1909994, Revision of R2-1906252, Prague, Czech Republic, Aug. 26-30, 2019.
Extended European search report with the supplementary European search report and the European search opinion issued by the European Patent Office for corresponding European Patent Application No. 19909588.6-1216, dated May 27, 2022.
ZTE, "Discussion on paging operation in NR-U", Agenda Item: 11.2, 3GPP TSG-RAN WG2 NR AH1807 Meeting, R2-1809839, Montreal, Canada, Jul. 2-6, 2018.
Oppo, Paging transmission on NR-U, Agenda Item: 7.6.4.5, 3GPP TSG-RAN WG1 Meeting #93, R1-1806855, Busan, Korea, May 21-25, 2018.
Nokia et al., "Paging operation in unlicensed spectrum", Agenda Item: 11.2, 3GPP TSG-RAN WG2 Meeting #AH-1807, R2-1810210, R2-1807124, Montreal, Canada, Jul. 2-6, 2018.
Interdigital Inc, "Discontinuous reception in NR-Unlicensed", Agenda Item: 11.2, 3GPP TSG-RAN WG2 NR AH1807 Meeting, R2-1809611, Montreal, Canada, Jul. 2-6, 2018.
Interdigital Inc, "Paging procedure in NR-U", Agenda Item: 11.2.2.1, 3GPP TSG-RAN WG2 Meeting#103bis, R2-1814006 (revision of R2-1811457), Chengdu, China, Oct. 8-12, 2018.
International Search Report and Written Opinion of the International Searching Authority issued by the China National Intellectual Property Administration for corresponding International Patent Application No. PCT/CN2019/071239, dated Aug. 28, 2019, with an English translation.
Notice of Preliminary Rejection issued by the Korean Intellectual Property Office for corresponding Korean Patent Application No. 10-2021-7020741, dated May 30, 2022, with an English translation.
ETSI TS 138 304 V15.1.0, "5G; NR; User Equipment (UE) procedures in idle mode and in RRC Inactive state" (3GPP TS 38.304 version 15.1.0 Release 15) Oct. 2018.
First Notification of Office Action and Search Report issued by the China National Intellectual Property Administration for corresponding Chinese Patent Application No. 201980085620.0, dated Oct. 28, 2023, with an English translation.

\* cited by examiner

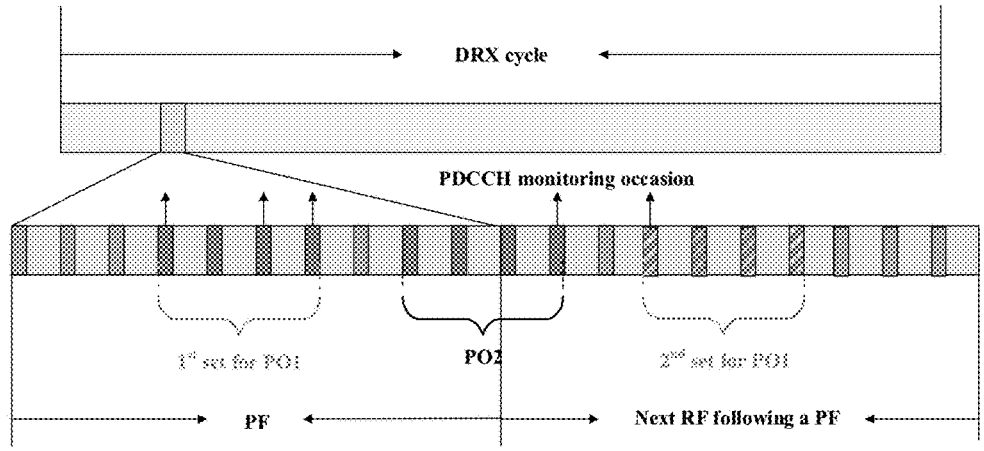

FIG. 12

```
-- ASN1 START
-- TAG-DOWNLINKCONFIGCOMMONSIB-START

DownlinkConfigCommonSIB ::=       SEQUENCE {
    frequencyInfoDL                   FrequencyInfoDL-SIB,
    initialDownlinkBWP                BWP-DownlinkCommon,
    bcch-Config                         BCCH-Config,
    pcch-Config                         PCCH-Config,
    ...
}

BCCH-Config ::=                   SEQUENCE { modificationPeriodCoeff    ENUMERATED {n2, n4, n8, n16},
    ...
}

PCCH-Config ::=           SEQUENCE {
...
firstPDCCH-MonitoringOccasionOfPO   CHOICE {
    sCS15KHZoneT                                              SEQUENCE (SIZE (1..4Z)) OF INTEGER (0..139),
    sCS30KHZoneT-SCS15KHZhalfT                                SEQUENCE (SIZE (1..4Z)) OF INTEGER (0..279),
    sCS60KHZoneT-SCS30KHZhalfT-SCS15KHZquarterT               SEQUENCE (SIZE (1..4Z)) OF INTEGER (0..559),
    sCS120KHZoneT-SCS60KHZhalfT-SCS30KHZquarterT-SCS15KHZoneEighthT        SEQUENCE (SIZE (1..4Z)) OF INTEGER
(0..1119),
    sCS120KHZhalfT-SCS60KHZquarterT-SCS30KHZoneEighthT-SCS15KHZoneSixteenthT   SEQUENCE (SIZE (1..4Z)) OF INTEGER
(0..2239),
    sCS120KHZquarterT-SCS60KHZoneEighthT-SCS30KHZoneSixteenthT                  SEQUENCE (SIZE (1..4Z)) OF INTEGER
(0..4479),
    sCS120KHZoneEighthT-SCS60KHZoneSixteenthT   SEQUENCE (SIZE (1..4Z)) OF INTEGER (0..8959),
    sCS120KHZoneSixteenthT                      SEQUENCE (SIZE (1..4Z)) OF INTEGER (0..17919)
    }  OPTIONAL,              -- Need R
    ...
}

-- TAG-DOWNLINKCONFIGCOMMONSIB-STOP
-- ASN1STOP
```

FIG. 13

```
-- ASN1START
-- TAG-DOWNLINK-CONFIG-COMMON-SIB-START

DownlinkConfigCommonSIB ::=    SEQUENCE {
    frequencyInfoDL                FrequencyInfoDL-SIB,
    initialDownlinkBWP             BWP-DownlinkCommon,
    bcch-Config                      BCCH-Config,
    pcch-Config                      PCCH-Config,
    ...
}

BCCH-Config ::=                SEQUENCE {  modificationPeriodCoeff    ENUMERATED {n2, n4, n8, n16},
    ...
}

PCCH-Config ::=                SEQUENCE {
    firstPDCCH-MonitoringOccasionOfPO    CHOICE {
        sCS15KHZoneT                                                 SEQUENCE (SIZE (1..4)) OF INTEGER (0..139),
        sCS30KHZoneT-SCS15KHZhalfT                                   SEQUENCE (SIZE (1..4)) OF INTEGER (0..279),
        sCS60KHZoneT-SCS30KHZhalfT-SCS15KHZquarterT                  SEQUENCE (SIZE (1..4)) OF INTEGER (0..559),
        sCS120KHZoneT-SCS60KHZhalfT-SCS30KHZquarterT-SCS15KHZoneEighthT          SEQUENCE (SIZE (1..4)) OF INTEGER
(0..1119),
        sCS120KHZhalfT-SCS60KHZquarterT-SCS30KHZoneEighthT-SCS15KHZoneSixteenthT    SEQUENCE (SIZE (1..4)) OF INTEGER
(0..2239),
        sCS120KHZquarterT-SCS60KHZoneEighthT-SCS30KHZoneSixteenthT                 SEQUENCE (SIZE (1..4)) OF INTEGER
(0..4479),
        sCS120KHZoneEighthT-SCS60KHZoneSixteenthT    SEQUENCE (SIZE (1..4)) OF INTEGER (0..8959),
        sCS120KHZoneSixteenthT                       SEQUENCE (SIZE (1..4)) OF INTEGER (0..17919)
    }   OPTIONAL,         -- Need R
    ...
}

-- TAG-DOWNLINK-CONFIG-COMMON-SIB-STOP
-- ASN1STOP
```

FIG. 14

```
-- ASN1START
-- TAG-DOWNLINK-CONFIG-COMMON-SIB-START

DownlinkConfigCommonSIB ::=     SEQUENCE {
    frequencyInfoDL             FrequencyInfoDL-SIB,
    initialDownlinkBWP          BWP-DownlinkCommon,
    bcch-Config                   BCCH-Config,
    pcch-Config                   PCCH-Config,
    ...
}

BCCH-Config ::=                 SEQUENCE { modificationPeriodCoeff    ENUMERATED {n2, n4, n8, n16},
    ...
}

PCCH-Config ::=                 SEQUENCE {
    firstPDCCH-MonitoringOccasionOfPO   CHOICE {
        sCS15KHZoneT                                                       SEQUENCE (SIZE (1..4)) OF INTEGER (0..139),
        sCS30KHZoneT-SCS15KHZhalfT                                         SEQUENCE (SIZE (1..4)) OF INTEGER (0..279),
        sCS60KHZoneT-SCS30KHZhalfT-SCS15KHZquarterT   SEQUENCE (SIZE (1..4)) OF INTEGER (0..559),
        sCS120KHZoneT-SCS60KHZhalfT-SCS30KHZquarterT-SCS15KHZoneEighthT          SEQUENCE (SIZE (1..4)) OF INTEGER
(0..1119),
        sCS120KHZhalfT-SCS60KHZquarterT-SCS30KHZoneEighthT-SCS15KHZoneSixteenthT    SEQUENCE (SIZE (1..4)) OF INTEGER
(0..2239),
        sCS120KHZquarterT-SCS60KHZoneEighthT-SCS30KHZoneSixteenthT               SEQUENCE (SIZE (1..4)) OF INTEGER
(0..4479),
        sCS120KHZoneEighthT-SCS60KHZoneSixteenthT   SEQUENCE (SIZE (1..4)) OF INTEGER (0..8959),
        sCS120KHZoneSixteenthT                                              SEQUENCE (SIZE (1..4)) OF INTEGER (0..17919)
    } OPTIONAL,                 -- Need R
    firstPDCCH1-MonitoringOccasionOfPO   CHOICE {
        sCS15KHZoneT                                                       SEQUENCE (SIZE (1..4)) OF INTEGER (0..139),
        sCS30KHZoneT-SCS15KHZhalfT                                         SEQUENCE (SIZE (1..4)) OF INTEGER (0..279),
        sCS60KHZoneT-SCS30KHZhalfT-SCS15KHZquarterT   SEQUENCE (SIZE (1..4)) OF INTEGER (0..559),
        sCS120KHZoneT-SCS60KHZhalfT-SCS30KHZquarterT-SCS15KHZoneEighthT          SEQUENCE (SIZE (1..4)) OF INTEGER
(0..1119),
        sCS120KHZhalfT-SCS60KHZquarterT-SCS30KHZoneEighthT-SCS15KHZoneSixteenthT    SEQUENCE (SIZE (1..4)) OF INTEGER
(0..2239),
        sCS120KHZquarterT-SCS60KHZoneEighthT-SCS30KHZoneSixteenthT               SEQUENCE (SIZE (1..4)) OF INTEGER
(0..4479),
        sCS120KHZoneEighthT-SCS60KHZoneSixteenthT   SEQUENCE (SIZE (1..4)) OF INTEGER (0..8959),
        sCS120KHZoneSixteenthT                                              SEQUENCE (SIZE (1..4)) OF INTEGER (0..17919)
    } OPTIONAL,                 -- Need R

...
}

-- TAG-DOWNLINK-CONFIG-COMMON-SIB-STOP
-- ASN1STOP
```

FIG. 15

```
-- ASN1START
-- TAG-DOWNLINK-CONFIG-COMMON-SIB-START

DownlinkConfigCommonSIB ::=      SEQUENCE {
    frequencyInfoDL              FrequencyInfoDL-SIB,
    initialDownlinkBWP           BWP-DownlinkCommon,
    bcch-Config                  BCCH-Config,
    pcch-Config                  PCCH-Config,
    ...
}

BCCH-Config ::=                  SEQUENCE {  modificationPeriodCoeff      ENUMERATED {n2, n4, n8, n16},
    ...
}

PCCH-Config ::=                  SEQUENCE {
    ...
    firstPDCCH-MonitoringOccasionOfPO  SEQUENCE (SIZE (1..2))of FirstPDCCH-MonitoringOccasionOfPO FirstPDCCH-MonitoringOccasionOfPO  CHOICE {
            sCS15KHZoneT                                                     SEQUENCE (SIZE (1..4)) OF INTEGER (0..139),
            sCS30KHZoneT-SCS15KHZhalfT                                       SEQUENCE (SIZE (1..4)) OF INTEGER (0..279),
            sCS60KHZoneT-SCS30KHZhalfT-SCS15KHZquarterT                      SEQUENCE (SIZE (1..4)) OF INTEGER (0..559),
            sCS120KHZoneT-SCS60KHZhalfT-SCS30KHZquarterT-SCS15KHZoneEighthT   SEQUENCE (SIZE (1..4)) OF INTEGER
(0..1119),
            sCS120KHZhalfT-SCS60KHZquarterT-SCS30KHZoneEighthT-SCS15KHZoneSixteenthT   SEQUENCE (SIZE (1..4)) OF INTEGER
(0..2239),
            sCS120KHZquarterT-SCS60KHZoneEighthT-SCS30KHZoneSixteenthT        SEQUENCE (SIZE (1..4)) OF INTEGER
(0..4479),
            sCS120KHZoneEighthT-SCS60KHZoneSixteenthT    SEQUENCE (SIZE (1..4)) OF INTEGER (0..8959),
            sCS120KHZoneSixteenthT                       SEQUENCE (SIZE (1..4)) OF INTEGER (0..17919)
        } OPTIONAL,          -- Need R
    ...
}

-- TAG-DOWNLINK-CONFIG-COMMON-SIB-STOP
-- ASN1STOP
```

FIG. 16

METHOD AND APPARATUS FOR CONFIGURING AND DETERMINING PAGING OPPORTUNITIES AND SYSTEM

CROSS-REFERENCE TO RELATED APPLICATION

This application is a continuation application of International Application PCT/CN2019/071239 filed on Jan. 10, 2019 and designated the U.S., the entire contents of which are incorporated herein by reference.

FIELD

This disclosure relates to the field of communications, and in particular to a method and apparatus for configuring and determining paging opportunities and a system.

BACKGROUND

Paging is able to help a network find terminals in an idle state (RRC_IDLE state) and an inactive state (RRC_INACTIVE state) and notify terminals in an idle state, an inactive state and a connected state (RRC_CONNECTED state) of system information (SI) update and a public warning system (PWS) information transfer.

FIG. 1 shows a process of initiating paging by a network device. As shown in FIG. 1, the network device initiates a paging procedure by transmitting a paging message at a paging occasion (PO) of a terminal equipment. In each discontinuous reception (DRX) cycle, a terminal equipment in an idle state or in an inactive state monitors paging at one paging occasion only, while a terminal equipment in a connected state may monitor paging at any paging occasion(s) signaled in system information.

FIG. 2 is a schematic diagram of a paging occasion on a New Radio (NR) licensed spectrum. As shown in FIG. 2, according to a system frame number (SFN) of a paging frame (PF) in NR and a PO index calculation formula, some terminal equipments may monitor paging messages at PO1, and some terminal equipments may monitor paging messages at PO2.

On the other hand, an issue of frequency resources is one of the important topics in the discussion of communication technologies. In order to solve the issue of frequency resources, in addition to improving resource utilization, the 3rd Generation Partnership Project (3GPP) also makes an attempt to use more frequency band, including use of unlicensed spectrum, such as an NR-based access to unlicensed spectrum (NR-U) mechanism.

As to NR-U, there exist the following deployment scenarios:

scenario A: carrier aggregation (CA) between NR and NR-U on a licensed spectrum;

scenario B: dual connectivity (DC) between Long Term Evolution (LTE) and NR-U on a licensed spectrum;

scenario C: standalone NR-U;

scenario D: an NR cell with a downlink on an unlicensed spectrum and an uplink on a licensed spectrum; and scenario E: dual connectivity between NR and NR-U on a licensed spectrum.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In using unlicensed spectrum to provide services for a terminal equipment, a network device and terminal equipment need to perform channel sensing before communication, that is, determine whether a channel is idle via listen before talk (LBT) or a clear channel assessment (CCA) mechanism. If the channel is idle, the network device performs downlink transmission, such as the delivery of paging messages. And when the network device monitors that the channel is busy, it is unable to perform downlink transmission.

It was found by the inventors that when an unlicensed spectrum is used to provide services for a terminal equipment, such as scenario C above, it is possible that the network device is unable to find the terminal equipment or notify the terminal equipment of update of system information and transfer of PWS information.

In order to solve at least one of the above problems or other similar problems, embodiments of this disclosure provide a method and apparatus for configuring and determining paging opportunities and a system.

According to a first aspect of the embodiments of this disclosure, there is provided a method for configuring and determining paging opportunities, applicable to a network device, the method including:

the network device generates first configuration information, the first configuration information including first parameter(s) associated with paging occasion(s), and the number of the paging occasion(s) associated with the first parameter(s) being greater than 4 and being an integral multiple of 4; and the network device transmits the first configuration information to a terminal equipment.

According to a second aspect of the embodiments of this disclosure, there is provided a method for configuring and determining paging opportunities, applicable to a terminal equipment, the method including:

the terminal equipment receives first configuration information transmitted by a network device, the first configuration information including first parameter(s) associated with paging occasion(s), and the number of the paging occasion(s) associated with the first parameter(s) being greater than 4 and being an integral multiple of 4; and the terminal equipment determines indices of paging occasion(s) of its own by using the first parameter(s).

According to a third aspect of the embodiments of this disclosure, there is provided an apparatus for configuring and determining paging opportunities, configured in a network device, the apparatus including:

a generating unit configured to generate first configuration information, the first configuration information including first parameter(s) associated with paging occasion(s), and the number of the paging occasion(s) associated with the first parameter(s) being greater than 4 and being an integral multiple of 4; and a transmitting unit configured to transmit the first configuration information to a terminal equipment.

According to a fourth aspect of the embodiments of this disclosure, there is provided an apparatus for configuring and determining paging opportunities, applicable to a terminal equipment, the apparatus including:

a receiving unit configured to receive first configuration information transmitted by a network device, the first configuration information including first parameter(s) associated with paging occasion(s), and the number of the paging occasion(s) associated with the first parameter(s) being greater than 4 and being an integral multiple of 4; and a determining unit configured to determine indices of paging opportunities of its own by using the first parameter(s).

According to a fifth aspect of the embodiments of this disclosure, there is provided a method for configuring and determining paging opportunities, applicable to a network device, the method including:

the network device generates first configuration information, the first configuration information including first parameter(s) associated with paging occasion(s), and the number of the paging occasion(s) associated with the first parameter(s) being 1, or 2, or 4; and the network device transmits the first configuration information to a terminal equipment, wherein the number of paging occasion(s) configured by the network device is determined at least by the first parameter(s) and a first scaling configured by the network device or a second scaling determined by the terminal equipment.

According to a sixth aspect of the embodiments of this disclosure, there is provided a method for configuring and determining paging opportunities, applicable to a terminal equipment, the method including:

the terminal equipment receives first configuration information transmitted by a network device, the first configuration information including first parameter(s) associated with paging occasion(s), and the number of the paging occasion(s) associated with the first parameter(s) being 1, or 2, or 4; and the terminal equipment determines indices of the paging occasion(s) of its own by using the first parameter(s) and a first scaling configured by the network device or a second scaling determined by the terminal equipment;

wherein the number of paging occasion(s) configured by the network device is determined by the first parameter(s) and the first scaling configured by the network device or the second scaling determined by the terminal equipment.

According to a seventh aspect of the embodiments of this disclosure, there is provided an apparatus for configuring and determining paging opportunities, configured in a network device, the apparatus including:

a generating unit configured to generate first configuration information, the first configuration information including first parameter(s) associated with paging occasion(s), and the number of the paging occasion(s) associated with the first parameter(s) being 1, or 2, or 4; and a transmitting unit configured to transmit the first configuration information to a terminal equipment, wherein the number of paging occasion(s) configured by the network device is determined at least by the first parameter(s) and a first scaling configured by the network device or a second scaling determined by the terminal equipment.

According to an eighth aspect of the embodiments of this disclosure, there is provided an apparatus for configuring and determining paging opportunities, configured in a terminal equipment, the apparatus including:

a first receiving unit configured to receive first configuration information transmitted by a network device, the first configuration information including first parameter(s) associated with paging occasion(s), and the number of the paging occasion(s) associated with the first parameter(s) being 1, or 2, or 4; and a first determining unit configured to determine indices of paging occasion(s) of the terminal equipment by using the first parameter(s) and a first scaling configured by the network device or a second scaling determined by the terminal equipment;

wherein the number of paging occasion(s) configured by the network device is determined by the first parameter(s) and the first scaling configured by the network device or the second scaling determined by the terminal equipment.

According to a ninth aspect of the embodiments of this disclosure, there is provided a method for configuring and determining paging opportunities, applicable to a network device, the method including:

the network device generates fourth configuration information, the fourth configuration information including second parameter(s) associated with paging occasion(s), a paging occasion associated with the second parameter(s) including a first number of downlink control channel monitoring occasions or a second number of sets of downlink control channel monitoring occasions, the first number being related to synchronization signal blocks (SSBs); and the network device transmits the fourth configuration information.

According to a tenth aspect of the embodiments of this disclosure, there is provided a method for configuring and determining paging opportunities, applicable to a terminal equipment, the method including:

the terminal equipment receives fourth configuration information transmitted by a network device, the fourth configuration information including second parameter(s) associated with paging occasion(s), a paging occasion associated with the second parameter(s) including a first number of downlink control channel monitoring occasions or a second number of sets of downlink control channel monitoring occasions, the first number being related to synchronization signal blocks (SSBs); and the terminal equipment determines indices of the paging occasion(s) of its own by using the second parameter(s).

According to an eleventh aspect of the embodiments of this disclosure, there is provided an apparatus for configuring and determining paging opportunities, configured in a network device, the apparatus including:

a generating unit configured to generate fourth configuration information, the fourth configuration information including second parameter(s) associated with paging occasion(s), a paging occasion associated with the second parameter(s) including a first number of downlink control channel monitoring occasions or a second number of sets of downlink control channel monitoring occasions, the first number being related to synchronization signal blocks (SSBs); and a first transmitting unit configured to transmit the fourth configuration information.

According to a twelfth aspect of the embodiments of this disclosure, there is provided an apparatus for configuring and determining paging opportunities, configured in a terminal equipment, the apparatus including:

a first receiving unit configured to receive fourth configuration information transmitted by a network device, the fourth configuration information including second parameter(s) associated with paging occasion(s), a paging occasion associated with the second parameter(s) including a first number of downlink control channel monitoring occasions or a second number of sets of downlink control channel monitoring occasions, the first number being related to synchronization signal blocks (SSBs); and a determining unit configured to determine paging occasion(s) of the terminal equipment by using the second parameter(s).

According to a thirteenth aspect of the embodiments of this disclosure, there is provided a method for configuring and determining paging opportunities, applicable to a network device, the method including:

the network device generates seventh configuration information, the seventh configuration information including third parameter(s) associated with DRX cycles, the third parameter(s) being associated with one or more DRX cycles, and the DRX cycles being used for a terminal equipment to access to an NR-based unlicensed spectrum or for a terminal equipment to be provided with services by an NR-based unlicensed spectrum; and the network device transmits the seventh configuration information to the terminal equipment.

According to a fourteenth aspect of the embodiments of this disclosure, there is provided a method for configuring and determining paging opportunities, applicable to a terminal equipment, the method including:

the terminal equipment receives seventh configuration information transmitted by a network device, the seventh configuration information being configured with third parameter(s) associated with DRX cycles, and the third parameter(s) is/are associated with one or more DRX cycles; and the terminal equipment accesses to an NR-based unlicensed spectrum or is provided with services by an NR-based unlicensed spectrum.

According to a fifteenth aspect of the embodiments of this disclosure, there is provided an apparatus for configuring and determining paging opportunities, configured in a network device, the apparatus including:

a generating unit configured to generate seventh configuration information, the seventh configuration information including third parameter(s) associated with DRX cycles, the third parameter(s) being associated with one or more DRX cycles, and the DRX cycles being used for a terminal equipment to access to an NR-based unlicensed spectrum or for a terminal equipment to be provided with services by an NR-based unlicensed spectrum; and a first transmitting unit configured to transmit the seventh configuration information to the terminal equipment.

According to a sixteenth aspect of the embodiments of this disclosure, there is provided an apparatus for configuring and determining paging opportunities, configured in a terminal equipment, the apparatus including:

a first receiving unit configured to receive seventh configuration information transmitted by a network device, the seventh configuration information being configured with third parameter(s) associated with DRX cycles, the third parameter(s) being associated with one or more DRX cycles; and a processing unit configured to access to an NR-based unlicensed spectrum according to the one or more DRX cycles or to be provided with services by an NR-based unlicensed spectrum.

According to a seventeenth aspect of the embodiments of this disclosure, there is provided a terminal equipment, including the apparatus as described in the fourth, eighth, twelfth or sixteenth aspects.

According to an eighteenth aspect of the embodiments of this disclosure, there is provided a network device, including the apparatus as described in the third, seventh, eleventh or fifteenth aspects.

According to a nineteenth aspect of the embodiments of this disclosure, there is provided a communication system, including the terminal equipment as described in the seventeenth aspect and the network device as described in the eighteenth aspect.

According to another aspect of the embodiments of this disclosure, there is provided a computer readable program, which, when executed in a terminal equipment, will cause a computer to carry out the method described in the second, sixth, tenth or fourteenth aspects in the terminal equipment.

According to a further aspect of the embodiments of this disclosure, there is provided a storage medium storing a computer readable program, which will cause a computer to carry out the method described in the second, sixth, tenth or fourteenth aspects in a terminal equipment.

According to yet another aspect of the embodiments of this disclosure, there is provided a computer readable program, which, when executed in a network device, will cause a computer to carry out the method described in the first, fifth, ninth or thirteenth aspects in the network device.

According to still another aspect of the embodiments of this disclosure, there is provided a storage medium storing a computer readable program, which will cause a computer to carry out the method described in the first, fifth, ninth or thirteenth aspects in a network device.

An advantage of the embodiments of this disclosure exists in that in embodiments of this disclosure, by increasing transmission opportunities of paging, such as increasing total paging occasions or increasing paging opportunities for paging a specific terminal, a network device may be ensured to find terminal equipments or punctually notify the terminal equipment of update of system information and transfer of public warning system (PWS) information.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 12 is still another schematic diagram of paging occasion(s) in a DRX cycle;

FIGS. 13 through 16 are schematic diagrams of a number of examples of structures of second parameter(s);

DETAILED DESCRIPTION

Figure 1:
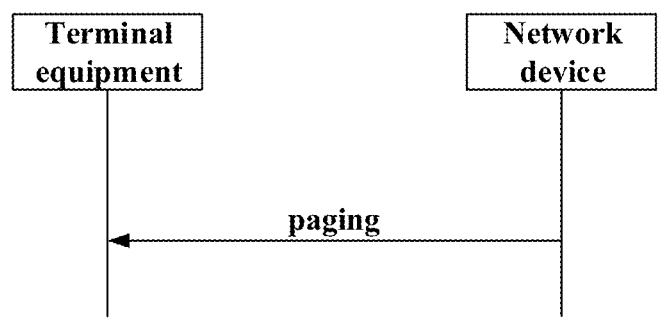
FIG. 1 is a schematic diagram of initiating a paging procedure by a network device.
Figure 2:
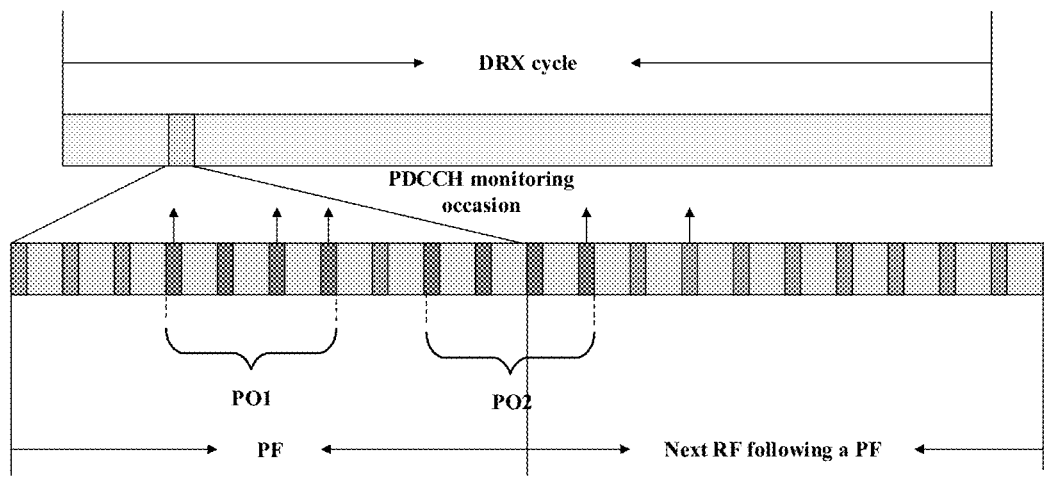
FIG. 2 is a schematic diagram of paging occasion(s) on an NR licensed spectrum.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" refers to, for example, equipment accessing to a communication network and receiving network services via a network device, and may also be referred to as "terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

Figure 3:
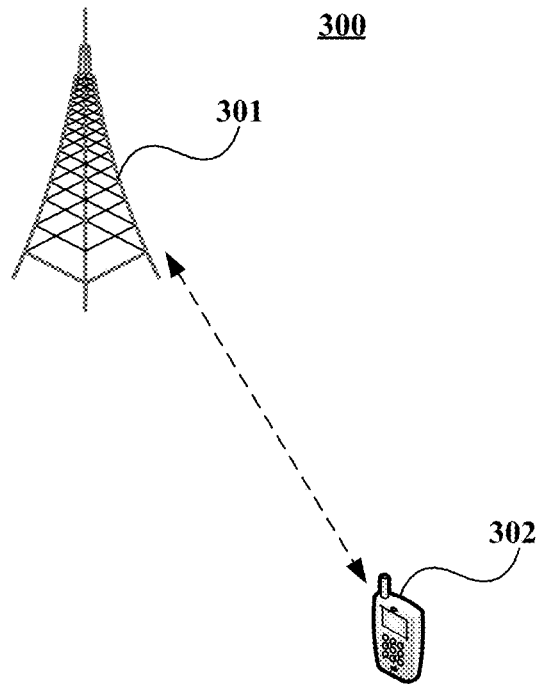
FIG. 3 is a schematic diagram of a communication system of an embodiment of this disclosure.

FIG. 3 is a schematic diagram of a communication system of an embodiment of this disclosure, in which a case where a terminal equipment and a network device are taken as examples is schematically shown. As shown in FIG. 3, a communication system 300 may include a network device 301 and a terminal equipment 302. For the sake of simplicity, an example having only one terminal equipment is schematically given in FIG. 3. And the network device 301 is, for example, a network device gNB in an NR system.

In the embodiment of this disclosure, existing traffics or traffics that may be implemented in the future may be performed between the network device 301 and the terminal equipment 302. For example, such traffics may include but not limited to enhanced mobile broadband (eMBB), massive machine type communication (MTC), and ultra-reliable and low-latency communication (URLLC), etc.

The terminal equipment 302 may transmit data to the network device 301, for example, in a grant-free transmission mode. The network device 301 may receive data transmitted by one or more terminal equipments 302, and feed back information (such as acknowledgement ACK/non-acknowledgement NACK) to the terminal equipment 302, and the terminal equipment 302 may acknowledge terminating a transmission process, or may further perform new data transmission, or may perform data retransmission, according to the feedback information.

Implementations of the embodiments of this disclosure shall be described below with reference to the accompanying drawings. These implementations are illustrative only, and are not intended to limit this disclosure.

Embodiment 1

Figure 4:
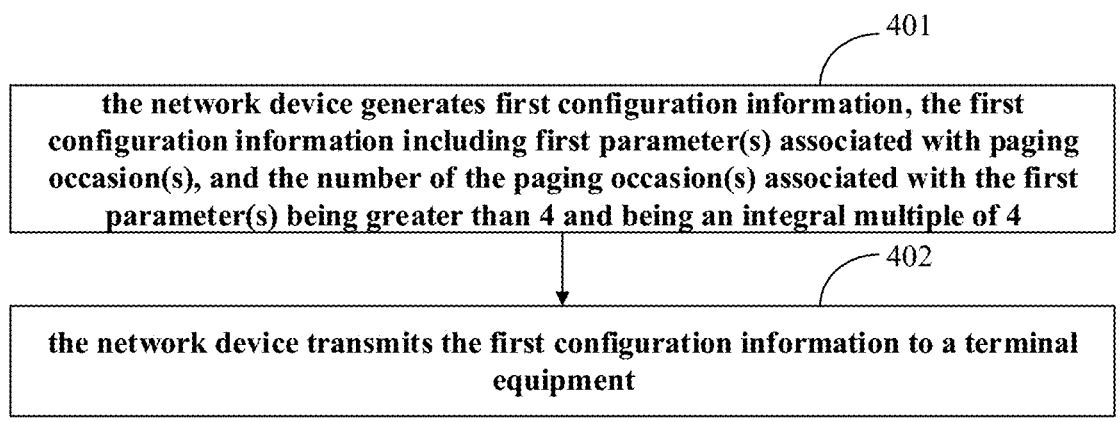
FIG. 4 is a schematic diagram of the method for configuring and determining paging opportunities of Embodiment 1.

The embodiment of this disclosure provides a method for configuring and determining paging opportunities. This method is applicable to a network device and to an NR-based unlicensed spectrum, and in this method, total paging occasions are increased by reusing current parameters and not introducing new parameters. FIG. 4 is a schematic diagram of the method for configuring and determining paging opportunities of this embodiment. Referring to FIG. 4, the method includes:

step 401: the network device generates first configuration information, the first configuration information including first parameter(s) associated with paging occasion(s), and the number of the paging occasion(s) associated with the first parameter(s) being greater than 4 and being an integral multiple of 4; and step 402: the network device transmits the first configuration information to a terminal equipment.

A manner of generating the above first configuration information is not limited in this embodiment.

In this embodiment, the above first parameter(s) is/are parameters used in existing standards, with an exception that the number of paging occasion(s) associated with these parameters is greater than 4 and is an integer multiple of 4. Therefore, paging occasion(s) are increased by reusing parameters in existing standards and modifying values of the parameters.

In this embodiment, the above first parameter(s) may include at least one of the following: a parameter indicating the number of paging occasion(s) associated with a paging frame, and a parameter indicating a first downlink control channel (PDCCH) monitoring occasion of a paging occasion.

The above "parameter indicating the number of paging occasion(s) associated with a paging frame" is, for example, the parameter "ns" in existing standards, and a value of the parameter may be an integer multiple of 4, such as 8, and 16, etc. The paging occasion associated with the paging frame may be in the paging frame or not in the paging frame but in a next radio frame of this paging frame, or in a designated radio frame after the paging frame, or in a next paging frame after the paging frame.

The above "a parameter indicating a first PDCCH monitoring occasion of a paging occasion" is, for example, the parameter "firstPDCCH-MonnoringOccasionOfPO" in existing standards, and a size of a value included therein may be expanded to an integer greater than 4, such as an integer multiple of 4, for example, 8, and 16, etc. One paging occasion may have one parameter value or multiple parameter values.

In this embodiment, after paging occasion(s) are increased, these paging occasions may be used to page a specific terminal equipment. When the number of paging occasion(s) of the terminal equipment is more than one, the network device may further configure the terminal equipment with parameters (Y) used by the terminal equipment to determine indices of the paging occasion(s) of its own.

For example, the network device may transmit third configuration information to the terminal equipment, the third configuration information including a maximum number (Y) of paging occasion(s) that the terminal equipment may monitor. The maximum number may be used as the above parameter, and the terminal equipment may determine the indices of the paging occasion(s) of its own by using the first parameter and the maximum number, with details being going to be described in Embodiment 2.

This embodiment also provides a method for configuring and determining paging opportunities. The method is applicable to a network device and to an NR-based unlicensed spectrum (NR-U). Different from the method in the embodiment shown in FIG. 4 in which current parameters are reused and no new parameter is introduced, a scale factor is introduced into this embodiment in addition to reusing current parameters.

Figure 5:
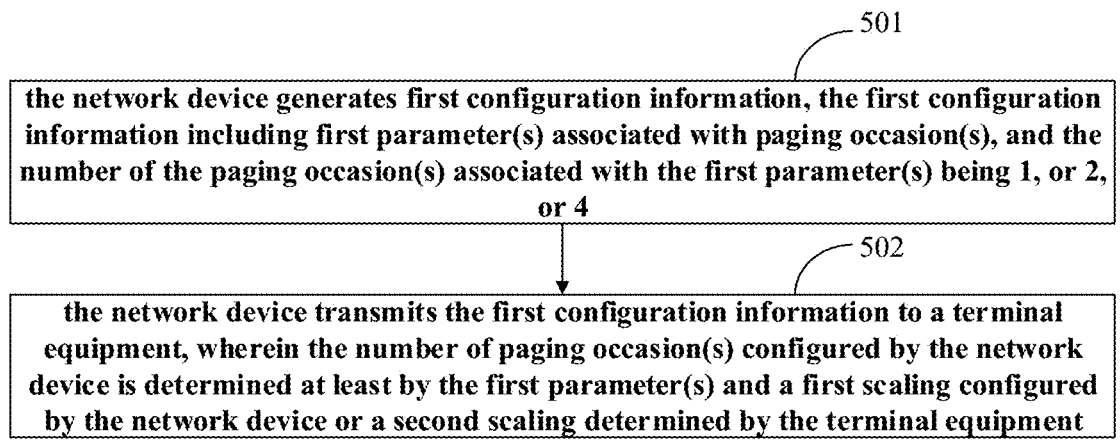
FIG. 5 is another schematic diagram of the method for configuring and determining paging opportunities of Embodiment 1.

FIG. 5 is a schematic diagram of the method for configuring and determining paging opportunities of this embodiment. As shown in FIG. 5, the method includes:

step 501: the network device generates first configuration information, the first configuration information including first parameter(s) associated with paging occasion(s), and the number of the paging occasion(s) associated with the first parameter(s) being 1, or 2, or 4; and step 502: the network device transmits the first configuration information to a terminal equipment, wherein the number of paging occasion(s) configured by the network device is determined at least by the first parameter(s) and a first scaling configured by the network device or a second scaling determined by the terminal equipment.

In this embodiment, the above first parameter is a parameter used in existing standards. In this embodiment, the existing parameter and existing possible configuration of the parameter may be reused. For example, the number of paging occasion(s) associated therewith may still be 1, or 2, or 4. Different from existing standards, a scale factor, such as the above first scaling or second scaling, is introduced into this embodiment. The number of paging occasion(s) configured by the network device is determined according to the first parameter and the scale factor, such as multiplying the number of paging occasion(s) associated with the first parameter by the scale factor to obtain the number of paging occasion(s) configured by the network device.

In this embodiment, the scale factor may be cell-specific or terminal equipment-specific, and its value may be an integer greater than 1, such as 2, and 4, etc.

In one implementation of this embodiment, the scale factor is configured by the network device. For example, the network device may further transmit second configuration information to the terminal equipment, the second configuration information including the scale factor (referred to as a first scaling), therefore, the number of the above paging occasion(s) configured by the network device is determined by at least the above first parameter and the first scaling.

In this implementation, the above second configuration information may be downlink information carrying a discovery reference signal (DRS) or a system information block (such as first system information block (SIB1)). Therefore, the above first scaling may be explicitly configured by the network device and be included in downlink transmission, such as the above DRS or SIB1.

In this implementation, the above second configuration information may also be related information based on an SSB, thus, the above first scaling may be implicitly indicated by the network device.

In another implementation of this embodiment, the scale factor is determined by the terminal equipment. For example, the terminal equipment may determine the scale factor (referred to as a second scaling) based on a measurement result related interference or load. Therefore, the number of the paging occasion(s) configured by the network device is determined by at least the first parameter and the second scaling.

For example, the terminal equipment may determine the second scaling according to at least one of a channel occupancy ratio (CR), a channel busy ratio (CBR) and a rate of success or failure or rate of number of times of success or failure of channel sensing (LBT or CCA, etc.).

The above channel occupancy ratio refers to a ratio of the number of transmitted or licensed resources (such as the number of sub-channels) to a total number of resources configured in a transmission pool within a period of time (such as a time of 1000 subframes before and after a current subframe). The above channel busy ratio is similar to a channel busy ratio in device-to-device (D2D) communication, in which a measurement (such as an RSSI) of resources in a configured transmission pool is measured, and a ratio of resources with results higher than threshold 1 to the total configured resources is taken as the channel busy ratio, wherein, the threshold 1 may be defined in standards, or may be configured by the network device. Further description of the rate of success or failure of channel sensing shall not be given here anymore. And the rate of number of times of success or failure of channel sensing may be a ratio of the number of channel being idle or busy (or transmitted/not transmitted) deemed after the channel sensing to a total number of times of channel sensing.

In this embodiment, after the paging occasion(s) are increased, these paging occasions may be used to page a specific terminal equipment, and when the number of paging occasion(s) of the terminal equipment is more than one, the network device may further configure the terminal equipment with parameters (Y) used by the terminal equipment to determine indices of the paging occasions of its own.

For example, the network device may transmit third configuration information to the terminal equipment, the third configuration information including the parameter Y. And the terminal equipment may determine the indices of the paging occasion(s) of its own by using the first parameter and the parameter Y, with details being going to be described in Embodiment 2.

In this embodiment, the above parameter Y may be the maximum number (Y) of paging occasion(s) that the terminal equipment may monitor. In addition, the above first scaling may also be taken as the parameter, that is, when the above first scaling is the maximum number (Y) of paging occasion(s) that the terminal equipment may monitor, the third configuration information may be omitted.

Figure 6:
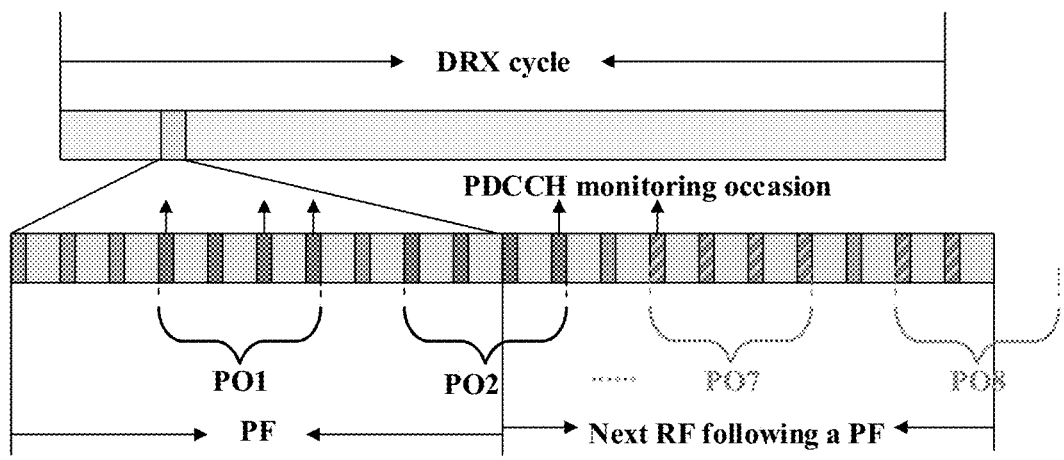
FIG. 6 is a schematic diagram of paging occasion(s) in a DRX cycle.

FIG. 6 is a schematic diagram of paging occasion(s) in a DRX cycle. As shown in FIG. 6, with the method of this embodiment, total paging opportunities are increased.

With the method of this embodiment, by supporting that one paging frame has more paging occasion(s), total paging occasions are increased. Using the method of this embodiment, the number of terminal equipments that are paged at the same paging occasion is reduced. Hence, when a paging occasion fails in transmitting or monitoring a paging message due to a channel sensing failure, the number of affected terminal equipments is reduced, which alleviates a case where a terminal equipment is unable to be paged due to a channel sensing failure and a paging message cannot be transmitted or monitored to some extent.

Furthermore, the method of this embodiment may reuse existing paging mechanisms to the greatest extent, including calculation of the system frame number (SFN) and the paging occasion (PO) index of the paging frame at the terminal equipment side, and the parameter configuration, etc., which has less effect on existing standards and products, thereby saving costs.

Embodiment 2

Figure 7:
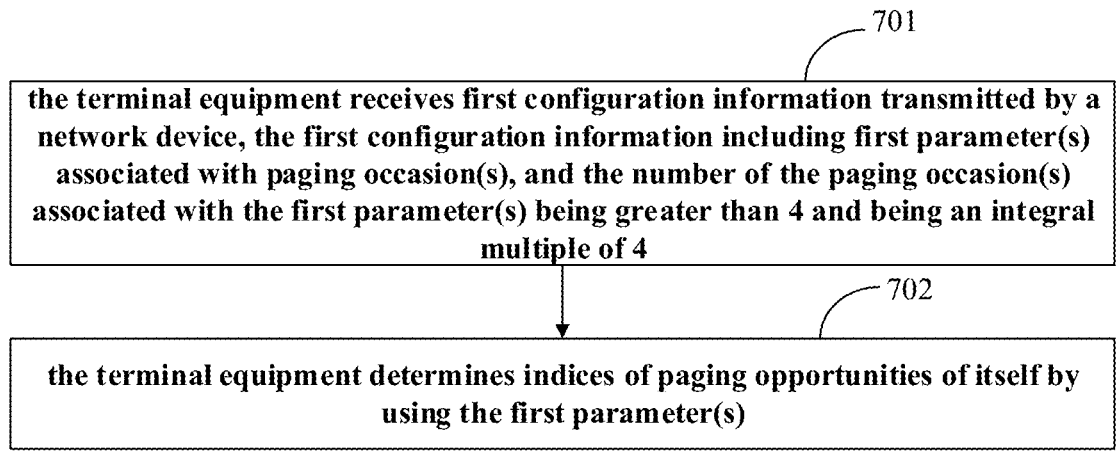
FIG. 7 is a schematic diagram of the method for configuring and determining paging opportunities of Embodiment 2.

The embodiment of this disclosure provides a method for configuring and determining paging opportunities. This method is applicable to an NR-based unlicensed spectrum and to a terminal equipment, which is processing at a terminal equipment side corresponding to the method of the embodiment shown in FIG. 4, with contents identical to those in the embodiment shown in FIG. 4 being not going to be described herein any further. FIG. 7 is a schematic diagram of the method for configuring and determining paging opportunities of this embodiment. Referring to FIG. 7, the method includes:

step 701: the terminal equipment receives first configuration information transmitted by a network device, the first configuration information including first parameter(s) associated with paging occasion(s), and the number of the paging occasion(s) associated with the first parameter(s) being greater than 4 and being an integral multiple of 4; and step 702: the terminal equipment determines indices of paging occasion(s) of its own by using the first parameter(s).

In this embodiment, the terminal equipment may also receive third configuration information transmitted by the network device. As described in Embodiment 1, the third configuration information may include the maximum number (Y) of paging occasion(s) that the terminal equipment may monitor, and the terminal equipment determines the indices of the paging occasion of its own according to the above first parameter and the maximum number.

Figure 8:
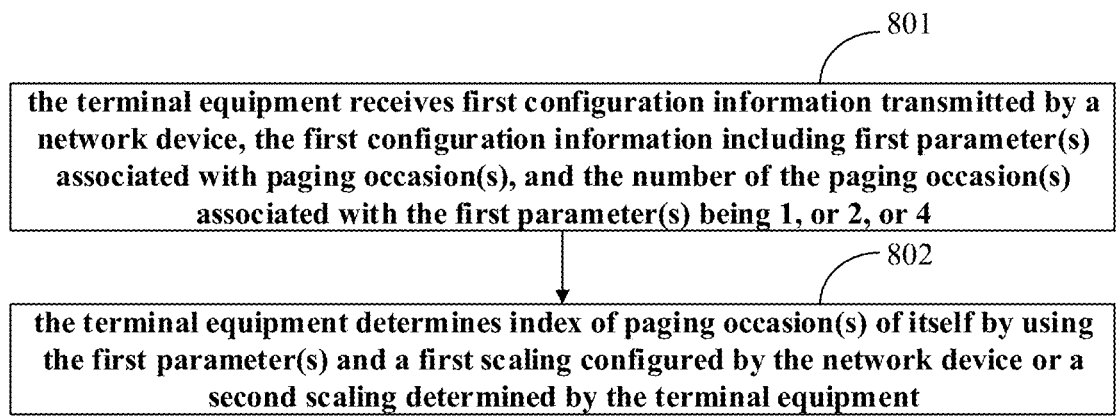
FIG. 8 is another schematic diagram of the method for configuring and determining paging opportunities of Embodiment 2.

The embodiment of this disclosure further provides a method for configuring and determining paging opportunities. This method is applicable to an NR-based unlicensed spectrum (NR-U) and to a terminal equipment, which is processing at a terminal equipment side corresponding to the method of the embodiment shown in FIG. 5, with contents identical to those in the embodiment shown in FIG. 5 being not going to be described herein any further. FIG. 8 is a schematic diagram of the method for configuring and determining paging opportunities of this embodiment. As shown in FIG. 8, the method includes:

step 801: the terminal equipment receives first configuration information transmitted by a network device, the first configuration information including first parameter(s) associated with paging occasion(s), and the number of the paging occasion(s) associated with the first parameter(s) being 1, or 2, or 4; and step 802: the terminal equipment determines indices of the paging occasion(s) of its own by using the first parameter(s) and a first scaling configured by the network device or a second scaling determined by the terminal equipment.

In this embodiment, the number of paging occasion(s) configured by the network device may also be determined by the first parameter(s) and the first scaling or the second scaling.

In this embodiment, corresponding to the embodiment shown in FIG. 5, the terminal equipment may determine the above second scaling based on a measurement result related interference or load, and determine the index of the paging occasion(s) of its own according to the above first parameter and the second scaling. For example, the terminal determines the second scaling according to a channel occupancy ratio, a channel busy ratio, a rate of success or failure of channel sensing and a rate of number of times of success or failure of channel sensing.

In this embodiment, corresponding to the embodiment shown in FIG. 5, the terminal equipment may further receive second configuration information transmitted by the network device, the second configuration information containing the above first scaling, and the terminal equipment may determine indices of the paging occasion of its own according to the above first parameter and the first scaling.

In this embodiment, corresponding to the embodiment shown in FIG. 5, the terminal equipment may further receive the third configuration information transmitted by the network device, the third configuration information containing the above parameter Y, and the terminal equipment may determine indices of the paging occasion of its own according to the above first parameter and the parameter Y.

In one implementation, the parameter Y may be the maximum number (Y) of paging occasion(s) that the terminal equipment may monitor, and the terminal equipment may determine indices of the paging occasion of its own by using the first parameter and the maximum number (Y).

In one implementation, the above first scaling may be the maximum number (Y) of paging occasion(s) that the terminal equipment may monitor. Therefore, the terminal equipment may determine indices of the paging occasion of its own by using the first parameter and the maximum number (Y). In this implementation, the above third configuration information may be omitted.

In this embodiment, the number of indices of the paging occasion(s) of the terminal equipment is at least one, and when the number of indices of the paging occasion(s) of the terminal equipment is at least two, the indices of the paging occasion(s) of the terminal equipment may be discrete or centralized in the time domain.

In one implementation, the terminal equipment may determine indices of the paging occasion of its own according to the following formula:

$i\_s \bmod (ns/Y) = \mathrm{floor}(UE\_ID/N) \bmod (ns/Y)$;

where, i_s is an index of a paging occasion of the terminal equipment, ns is the above first parameter, Y is the above maximum number, which may be the above first scaling or the above parameter Y, UE_ID is identification of the terminal equipment, and N is a total number of paging frames in a DRX cycle of the terminal equipment.

In this implementation, index i_s of a current PO is reused, but a formula for determining i_s is updated, so that different paging occasions belonging to identical terminal equipments are discrete.

In another implementation, the terminal equipment may determine indices of the paging occasion of its own according to the following formula:

$(i\_s-n)/Y = \mathrm{floor}(UE\_ID/N) \bmod (ns/Y)$;

where, n is a variable, denoting a sequence number of a paging occasion of the terminal equipment, which may be an integer in a range of [0, Y−1], i_s is an index of a paging occasion of the terminal equipment, corresponding to the sequence number n, ns is the above first parameter, Y is the above maximum number, which may be the above first scaling or the above parameter Y, UE_ID is identification of the terminal equipment, and N is a total number of paging frames in a DRX cycle of the terminal equipment.

In this implementation, the index i_s of the current PO is also reused, but the formula for determining i_s is updated, so that paging occasion(s) belonging to identical terminal equipments are centralized.

In a further implementation, the terminal equipment may determine indices of the paging occasion of its own according to the following formula:

$i\_s = \mathrm{floor}(UE\_ID/N) \bmod (ns/Y)$, $i\_s+1+(n-1)*(ns/Y)$;

where, i_s+1 is an index of a first paging occasion of the terminal equipment, i_s+1+(n−1)*(ns/Y) is an index of the n-th paging occasion of the terminal equipment, ns is the above first parameter, Y is the above maximum number, which may be the above first scaling or the above parameter Y, n<=Y, UE_ID is identification of the terminal equipment, and N is a total number of paging frames in a DRX cycle of the terminal equipment.

In this embodiment, the definition of i_s is modified, in which i_s+1 denotes the index of the first PO of the terminal equipment, and the formula for determining i_s is updated, so that different paging occasions belonging to identical terminal equipments are discrete. Therefore, indices of all paging occasions of the terminal equipment are obtained: i_s+1, i_s+ns/Y+1, i_s+2*(ns/Y)+1, . . . , i_s+1+(n−1)*(ns/Y), n<=Y In still another implementation, the terminal equipment may determine indices of the paging occasion of its own according to the following formula:

$$i\_s/Y = \text{floor}(UE\_ID/N) \bmod (ns/Y),$$

$$i\_s+n;$$

where, i_s is an index of a first paging occasion of the terminal equipment, i_s+n is an index of the n-th paging occasion of the terminal equipment, ns is the above first parameter, Y is the above maximum number, which may be the above first scaling or the above parameter Y, n<=Y, UE_ID is identification of the terminal equipment, and N is a total number of paging frames in a DRX cycle of the terminal equipment.

In this implementation, the definition of i_s is also modified, in which i_s+1 denotes the index of the first paging occasion of the terminal equipment, and the formula for determining i_s is updated, so that different paging occasions belonging to identical terminal equipments are centralized. Therefore, indices of all paging occasions of the terminal equipment are obtained: i_s+1, i_s+2, . . . , i_s+n, n<=Y.

In this embodiment, the terminal equipment may monitor paging at a part of paging occasion(s) that may be monitored, until paging is received or the network indicates to stop monitoring or all paging occasions are monitored; or, the terminal equipment may monitor paging at all paging occasions that may be monitored.

For example, as mentioned above, Y denotes the maximum number of paging occasion(s) that a terminal equipment may monitor, which means that the terminal equipment may monitor a maximum of Y paging occasion(s) in a DRX cycle. The terminal equipment may monitor paging at all its own paging occasion(s), that is, the terminal equipment monitors Y paging occasion(s); and the terminal equipment may also monitor paging only at a part of its own paging occasion(s), until it receives paging, or Y paging occasion(s) are monitored. That is, in a DRX cycle, the terminal equipment monitors paging, and when it receives paging or the number of paging occasion(s) that are monitored reaches Y, it stops monitoring. In other words, in multiple paging occasions of a terminal equipment in a DRX cycle, identical paging information may be transmitted, or different contents may be transmitted; and if paging contents are identical, the terminal equipment monitors a part of paging contents only or monitors all of the paging contents; otherwise, the terminal equipment monitors all the paging contents. In addition, behaviors of the terminal equipment may also be controlled by the network device. For example, the network device notifies the terminal equipment to stop monitoring at a paging occasion or notifies the terminal equipment that there exists no paging, then the terminal equipment may not monitor in remaining paging occasion(s) in the DRX cycle.

With the method of this embodiment, by supporting that one paging frame has more paging occasions, total paging occasions are increased. Using the method of this embodiment, the number of terminal equipments that are paged at the same paging occasion is reduced. Hence, when a paging message is not transmitted or monitored due to a channel sensing failure, the number of affected terminal equipments is reduced, which alleviates a case where a terminal equipment is unable to be paged due to a channel sensing failure and a paging message cannot be transmitted or monitored to some extent.

Embodiment 3

The embodiment of this disclosure provides a method for configuring and determining paging opportunities. This method is applicable to an NR-based unlicensed spectrum (NR-U) and to a network device. Different from the methods in embodiments 1 and 2 in which total paging occasions are increased by extending paging occasion(s) in a paging frame, paging opportunities used for paging a specific terminal are increased by extending paging occasion(s) (POs) in this embodiment.

Figure 9:
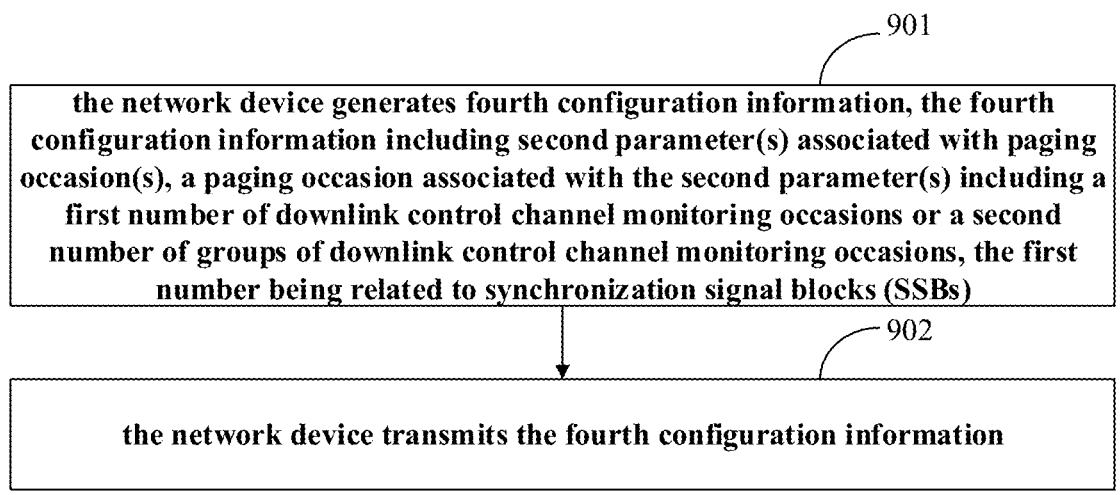
FIG. 9 is a schematic diagram of the method for configuring and determining paging opportunities of Embodiment 3.

FIG. 9 is a schematic diagram of the method for configuring and determining paging opportunities of this embodiment. As shown in FIG. 9, the method includes:

step 901: the network device generates fourth configuration information, the fourth configuration information including second parameter(s) associated with paging occasion(s), a paging occasion associated with the second parameter(s) including a first number of downlink control channel monitoring occasions or a second number of sets of downlink control channel monitoring occasions, the first number being related to synchronization signal blocks (SSBs); and step 902: the network device transmits the fourth configuration information.

A manner of generating the fourth configuration information is not limited in his embodiment.

In this method, paging opportunities for paging a specific terminal equipment are increased by expanding paging occasion(s), thereby overcoming a problem of reduction of paging opportunities caused by channel sensing failure and that a network device is unable to find a terminal equipment or unable to timely adjust update of system information of a terminal equipment and transfer of PWS information that may further possibly be caused.

In one implementation of this embodiment, a paging occasion with which the second parameter is associated includes a first number of downlink control channel (PDCCH) monitoring occasions.

Figure 10:
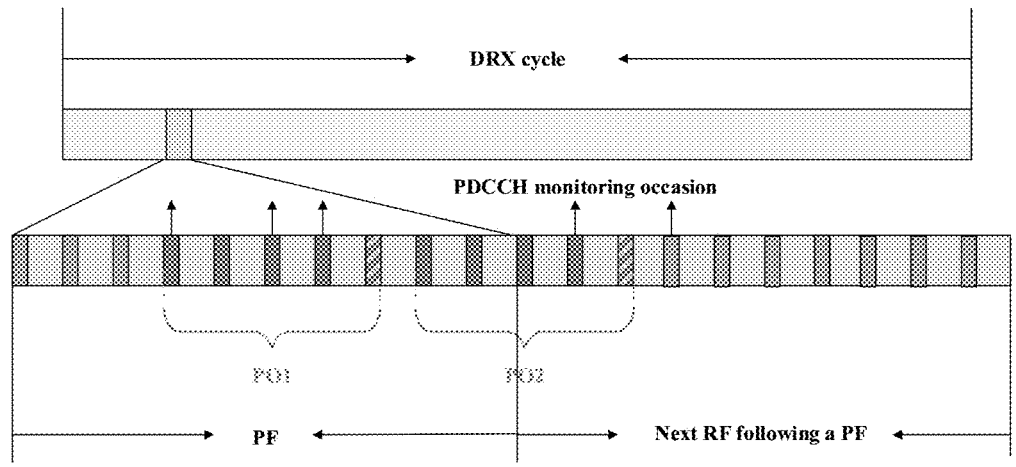
FIG. 10 is another schematic diagram of paging occasion(s) in a DRX cycle.

In this implementation, one paging occasion includes more (first number) continuous PDCCH monitoring occasions, as shown in FIG. 10.

In this implementation, the above first number is related to the SSBs, which are defined as synchronization signal/physical broadcast channel blocks (SS/PBCH blocks), referred to as synchronization signal blocks (SSBs).

For example, the first number may be at least one of the following, such as the number (S) of actually transmitted SSBs determined according to information provided in a first system information block (SIB1), an integer multiple (xS) of the number of actually transmitted SSBs determined according to information provided in a first system information block (SIB1), a number (S') determined according to the number of SSBs determined according to information provided the network, and an integer multiple (xS') of the number determined according to the number of SSBs determined according to information provided the network.

The information provided in the above first system information block is, for example, ssb-PositionsInBurst. The above x may be an integer greater than 1. The above information provided by the network is, for example, at least one of the number of actually transmitted SSBs, an offset between candidate time-domain SSB positions, and an offset between candidate SSB groups, and the network device may provide the above information via, for example, downlink control information (DCI). Furthermore, S' may be identical to or different from the above S.

In the method of this implementation, the paging occasion(s) are extended by including more continuous PDCCH monitoring occasions; wherein a time for the terminal equipment to monitor the paging opportunities is centralized, with an advantage that the number of times of switching on and off of a terminal wireless transceiver equipment and a duration of switching on are basically unchanged, hence, energy consumption of the terminal is not much increased compared to working on a licensed spectrum.

In another implementation of this embodiment, a paging occasion with which the second parameter is associated includes a second number of sets of downlink control channel monitoring occasions.

In this implementation, one paging occasion includes multiple sets (a second number of sets) of continuous PDCCH monitoring occasions. In this implementation, the multiple sets of continuous PDCCH monitoring occasions may be continuously mapped to one paging occasion, as shown in FIG. 11, and two sets of PDCCH monitoring occasions of PO1 are continuously mapped; or, the above multiple sets of continuous PDCCH monitoring occasions may also be sequentially mapped to different paging occasions, as shown in FIG. 12, and continuous two sets of PDCCH monitoring occasions are sequentially mapped to PO1 and PO2.

In this implementation, the above second parameter(s) may include at least one piece of the following information: a value of a second number of starting PDCCH monitoring occasions of a paging occasion and a second number of values of a starting PDCCH monitoring occasion of a paging occasion; wherein in the time domain, each set of PDCCH monitoring occasions are associated (or belong to or mapped to) with different paging occasions in a centralized way, or each set of PDCCH monitoring occasions are sequentially associated (or belong to or mapped to) with different paging occasions in a discrete way.

Figure 11:
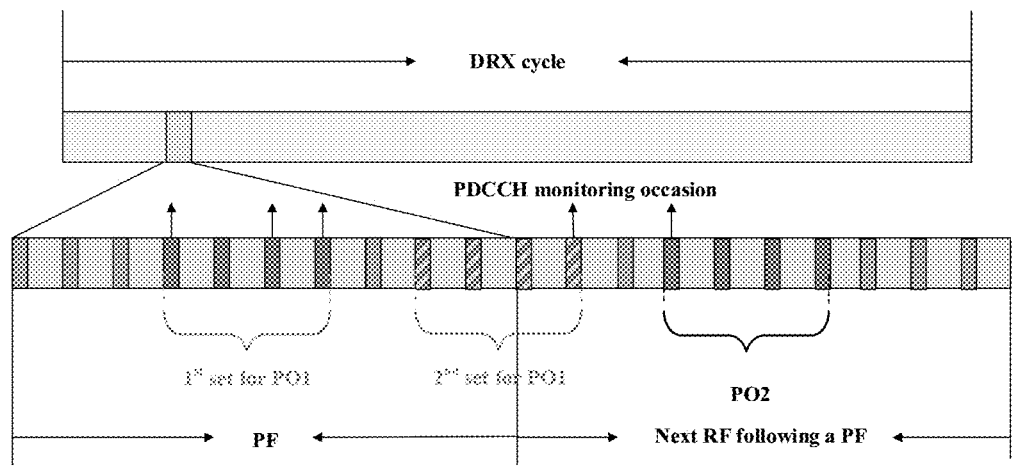
FIG. 11 is a further schematic diagram of paging occasion(s) in a DRX cycle.

As shown in FIGS. 11 and 12, multiple sets of continuous PDCCH monitoring occasions are continuously mapped to one PO, which may be that one PO corresponds to multiple starting PDCCH values, or one starting PDCCH of one PO includes multiple values, and may be achieved by modifying current parameters, or may be achieved by introducing new parameters, or may be achieved by modifying current parameters and introducing new parameters.

For example, in the method where one starting PDCCH of one PO includes multiple values, assuming that one PO uses two values, former two values correspond to a first PO (i.e. PO1, including a first set of PO1 and a second set of PO1), and next two values correspond to a second PO (i.e. PO2), hence, each PO may include continuous multiple sets of PDCCH monitoring occasions.

In this example, the above second parameter is, for example, firstPDCCH-MonitoringOccasionOfPO, and that one starting PDCCH of one PO including multiple values is achieved by modifying this parameter, such as modifying a value of Z in a current field description of the above parameter; where Z is a maximum number of sets of continuous PDCCH monitoring occasions that one PO may include. Z may be predefined, or may be configured by the network, it may be cell-specific or terminal-specific, and it may be identical or different at different RRC states. FIG. 13 is an example of a structure of the parameter firstPDCCH-MonaoringOccasionOfPO, in which a content enclosed by the dashed frame is Z.

For another example, in the method where one PO corresponds to multiple starting PDCCH values, existing parameters may be used and new parameters may be introduced. For example, currently, one PO corresponds to one starting PDCCH value, which is described by a parameter firstPDCCH-MonitoringOccasionOfPO. On this basis, another parameter firstPDCCH1-MonitoringOccasionOfPO is added in this embodiment, and configuration methods and description methods of the parameter firstPDCCH1-MonitoringOccasionOfPO and the above parameter firstPDCCH-MonitoringOccasionOfPO may be identical. Therefore, one PO corresponding to two starting PDCCH values is achieved by these two parameters. FIG. 14 is an example of a structure of the parameter firstPDCCH-MonitoringOccasionOfPO, and FIG. 15 is an example of a structure of the parameter firstPDCCH1-MonitoringOccasionOfPO, showing description of the above parameters by dashed frames.

In this example, the above second parameter(s) is/are firstPDCCH-MonitoringOccasionOfPO and firstPDCCH1-MonitoringOccasionOfP. And names of the above parameters may be changed, and numbers thereof are not limited to 2.

For another example, in the method where one PO corresponds to multiple starting PDCCH values, structures of the parameters may be modified, for example, the structure of the currently used parameter firstPDCCH-MonitoringOccasionOfPO may be modified. FIG. 16 is an example of a structure of the modified parameter firstPDCCH-MonitoringOccasionOfPO, showing the description of the above parameter by a dashed frame; where Z is a maximum number of sets of continuous PDCCH monitoring occasions that one PO may include. Z may be predefined, or may be configured by the network, it may be cell-specific or terminal-specific, and it may be identical or different at different RRC states.

In this implementation, a new parameter may be introduced to define an interval between two sets of PDCCH monitoring occasions to which each PO corresponds, the parameter may be in unit of PDCCH or symbol etc.; in addition, the number of sets (the second number of sets) of PDCCH monitoring occasions to which each PO corresponds may also be determined, the number may be defined in standards, or may be configured by the network. Hence, multiple sets of continuous PDCCH monitoring occasions may also be continuously mapped to one PO.

For example, in this example, the network device may also transmit fifth configuration information to the terminal equipment, the fifth configuration information including intervals between the second number of sets of PDCCH monitoring occasions within the paging occasion associated with the second parameter(s), hence, the above intervals are defined by introducing new parameters. And the network device may further transmit sixth configuration information to the terminal equipment, the sixth configuration information being configured with the above second number, thereby the above second number is defined by introducing new parameters.

As shown in FIG. 12, multiple sets of continuous PDCCH monitoring occasions are sequentially mapped to different POs, which may be that one PO corresponds to multiple starting PDCCH values, or one starting PDCCH of one PO includes multiple values, and may be achieved by modifying current parameters, or may be achieved by introducing new parameters, or may be achieved by modifying current parameters and introducing new parameters.

For example, in the method where one starting PDCCH includes multiple values, assuming that one PO uses 2 values and there are 2 POs, the first and third values correspond to a first PO (i.e. PO1), and the second and fourth values correspond to a second PO (i.e. PO2).

The method of modifying the parameters or the method of introducing the new parameters or the method of modifying the parameters and introducing new parameters is identical to that of FIG. 11, which shall not be described herein any further.

In the method of this implementation, the paging occasion(s) are extended in a manner where one paging occasion includes multiple sets of continuous PDCCH monitoring occasions. For example, paging occasion(s) belonging to identical terminal are concentrated in a time perspective in a continuous mapping manner, with an advantage that the number of times of switching on and off of a terminal wireless transceiver equipment and a duration of switching on are basically unchanged, hence, energy consumption of the terminal is not much increased compared to working on a licensed spectrum. For another example, paging occasion(s) belonging to identical terminal are made discrete in a time perspective in a manner where different paging occasions are sequentially mapped, with an advantage that a probability that LBT of all these paging occasions fails is lowered, thereby increasing a probability of finding these terminals or punctually notifying these terminals of update of system information and transfer of PWS information.

In a further implementation of this embodiment, the paging occasion(s) are extended by extending durations of the PDCCH monitoring occasions. For example, the durations of the PDCCH monitoring occasions may be extended to 4 symbols or even greater than 4 symbols.

Figure 17:
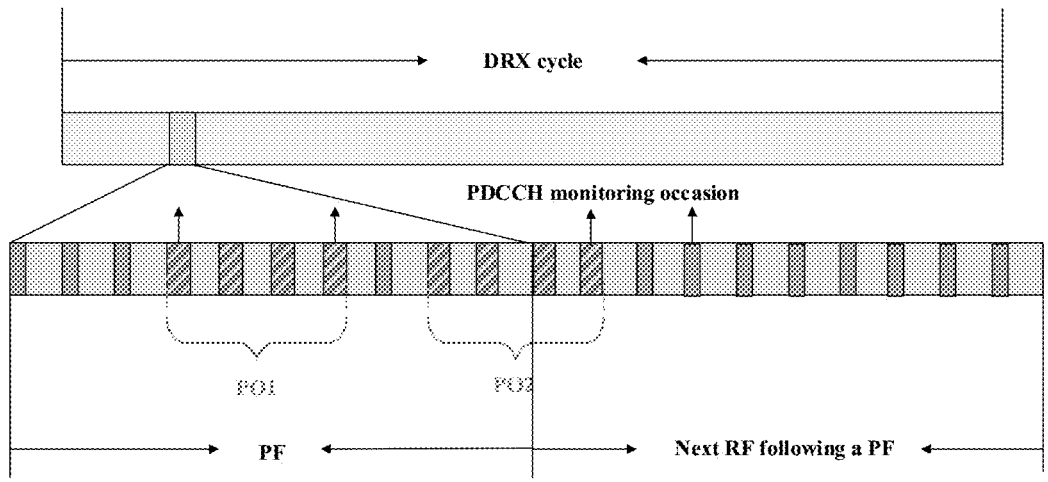
FIG. 17 is yet another schematic diagram of paging occasion(s) in a DRX cycle.

In this implementation, the PDCCH monitoring occasions used for paging may only be extended. For example, a duration of at least one PDCCH monitoring occasion within one paging occasion associated with the second parameter(s) is greater than or equal to 4 symbols. FIG. 17 shows a case where the PDCCH monitoring occasions used for paging are extended.

In this implementation, durations of all PDCCHs may be extended. For example, the durations of all the PDCCHs are greater than or equal to 4 symbols, thereby extending the PDCCH monitoring occasions used for paging.

In this implementation, the paging occasion(s) are extended by extending the durations of the PDCCH monitoring occasions. In this method, times for the terminal to monitor the paging opportunities are concentrated, with an advantage that the number of times of switching on and off of a terminal wireless transceiver equipment and a duration of switching on are basically unchanged, hence, energy consumption of the terminal is not much increased compared to working on a licensed spectrum.

In this embodiment, the above implementations may be used in a combined manner or may be used separately, which is not limited in this embodiment.

In this embodiment, in order to assist the terminal equipment to determine the indices of the paging occasion(s) of its own, the network device may further transmit third configuration information to the terminal equipment, the third configuration information including the maximum number (Y) of paging occasion(s) that are able to be monitored by the terminal equipment. Hence, the terminal equipment may determine the indices of the paging occasion(s) of its own according to the maximum number (Y) in conjunction with other parameters or configurations.

For example, based on an (i_s+1)-th value of the above parameter firstPDCCH-MonitoringOccasionOfPO, the terminal equipment may determine the number of starting PDCCH monitoring occasions of an (i_s+1)-th PO, such as the number of starting PDCCH monitoring occasions mod p=an (i_s+1)-th value of firstPDCCH-MonitoringOccasionOfPO; where, p=ns/Y, which shall be described in the following embodiments.

Contents of the above third configuration information are identical to those in Embodiment 1, which shall not be described herein nay further. And as described in Embodiment 1, the third configuration information is optional, that is, the terminal equipment may determine the indices of the paging occasion(s) of its own according to the above second parameter(s) and other configurations.

The method of this embodiment reuses the current paging mechanism to a greatest extent, including configuration of the parameters related to the paging frames and paging occasion(s), and calculation of the paging frames and paging occasion(s), etc., thereby reducing research and testing costs and lowering equipment costs.

Embodiment 4

The embodiment of this disclosure provides a method for configuring and determining paging opportunities. This method is applicable to an NR-based unlicensed spectrum (NR-U) and to a terminal equipment, which is processing at a terminal equipment side corresponding to the method of Embodiment 3, with contents identical to those in Embodiment 3 being not going to be described herein any further.

Figure 18:
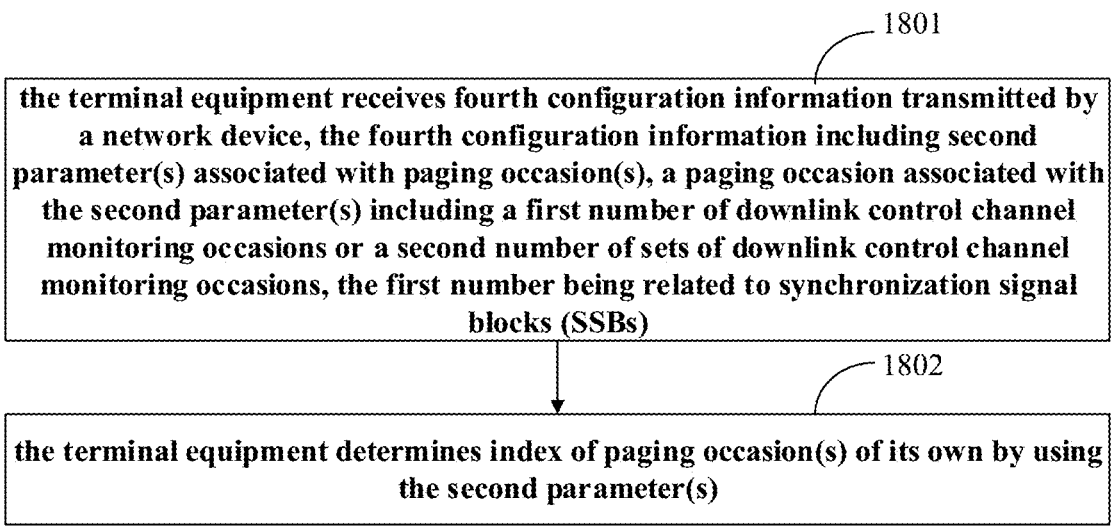
FIG. 18 is a schematic diagram of the method for configuring and determining paging opportunities of Embodiment 4.

FIG. 18 is a schematic diagram of the method for configuring and determining paging opportunities of this embodiment. As shown in FIG. 18, the method includes:

step 1801: the terminal equipment receives fourth configuration information transmitted by a network device, the fourth configuration information including second parameter(s) associated with paging occasion(s), a paging occasion associated with the second parameter(s) including a first number of downlink control channel monitoring occasions or a second number of sets of downlink control channel monitoring occasions, the first number being related to synchronization signal blocks (SSBs); and step 1802: the terminal equipment determines indices of paging opportunities of its own by using the second parameter(s).

In this embodiment, corresponding to Embodiment 3, the terminal equipment may further receive fifth configuration information transmitted by the network device, the fifth configuration information including intervals between a second number of sets of downlink control channel monitoring occasions within a paging occasion associated with the second parameter(s), and the terminal equipment determines paging opportunities of its own according to the second parameter(s) and the above intervals.

In this embodiment, corresponding to Embodiment 3, the terminal equipment may further receive sixth configuration information transmitted by the network device, the sixth configuration information including the second number, and the terminal equipment determines paging opportunities of its own according to the second parameter(s), the second number and the above intervals.

In this embodiment, the terminal equipment may determine a position of a starting PDCCH monitoring occasion of first paging occasion(s) of its own according to the above second parameter(s), and the terminal equipment may further receive the third configuration information transmitted by the network device, and may determine the position of the starting PDCCH monitoring occasion of the first paging occasion(s) of its own according to the above second parameter(s) and the maximum number (Y) of paging occasion(s) that the terminal equipment may monitor included in the third configuration information.

For example, the terminal equipment may determine the above position according to a relation as below:

the number of starting downlink control channel monitoring occasions mod p=an (is_s+1)-th value of firstPDCCH-MonitoringOccasionOfPO;

where, p=ns/Y, i_s+1 is the position of the starting downlink control channel monitoring occasion of the first paging occasion of the terminal equipment, ns and firstPDCCH-MonitoringOccasionOfPO are the above second parameter(s), and Y is the above maximum number.

In this embodiment, similar to Embodiment 3, the first number may be at least one of the following: the number (S) of actually transmitted SSBs determined according to information provided in a first system information block (SIB1), multiples (xS) of the number of actually transmitted SSBs (S) determined according to information provided in a first system information block (SIB1), a number (S') determined according to the number of SSBs that is determined according to information provided by a network, and multiples (xS') of a number determined according to the number of SSBs that is determined according to information provided by a network.

In this embodiment, similar to Embodiment 3, the second parameter(s) may include at least one piece of the following information: values of a second number of starting downlink control channel monitoring occasions of a paging occasion, and a second number of values of one starting downlink control channel monitoring occasion of a paging occasion; wherein in the time domain, the sets of downlink control channel monitoring occasion sets are associated with different paging occasions in a centralized way, or the sets of downlink control channel monitoring occasions are sequentially associated with different paging occasions in a discrete way.

In this embodiment, similar to Embodiment 3, a duration of at least one PDCCH monitoring occasion within at least one paging occasion associated with the second parameter(s) may be greater than or equal to 4 symbols.

In this embodiment, similar to Embodiment 2, the terminal equipment may monitor paging at a part of paging occasions that may be monitored, until paging is received or the network indicates to stop monitoring or all paging occasions are monitored; or, the terminal equipment may monitor paging at all paging occasions that may be monitored.

For example, one paging occasion may include multiple sets of continuous PDCCH monitoring occasions. The terminal equipment may monitor paging at all PDCCH monitoring occasions of its own paging occasion, and the terminal equipment may also monitor paging only on part of the PDCCH monitoring occasions of its own paging occasion, until paging is received or all PDCCH monitoring occasions are monitored. That is to say, in a DRX cycle, the terminal equipment monitors the paging, and stops monitoring when it receives the paging or monitors all PDCCH monitoring occasions. In other words, in multiple sets of continuous PDCCH monitoring occasions in a paging occasion, the same paging information may be transmitted, or different contents may be transmitted; if the paging contents are the same, then the terminal equipment only monitors part or all of it, otherwise, the terminal equipment monitors all of the PDCCH monitoring occasions. In addition, the behavior of the terminal equipment may also be controlled by the network device. For example, the network device notifies the terminal equipment to stop monitoring or notifies the terminal equipment that there is no paging during a set of continuous PDCCH monitoring occasions, then in the remaining PDCCH monitoring occasions of the paging occasion, The terminal equipment may no longer monitor.

The method of this embodiment reuses the current paging mechanism to a greatest extent, including configuration of the parameters related to the paging frames and paging occasion(s), and calculation of the paging frames and paging occasion(s), etc., thereby reducing research and testing costs and lowering equipment costs.

Embodiment 5

The embodiment of this disclosure provides a method for configuring and determining paging opportunities. This method is applicable to a network device. Different from the methods in embodiments 1 and 2 in which total paging occasions are increased by extending paging occasion(s) in a paging frame, and different from the methods in embodiments 3 and 4 in which paging opportunities used for paging a specific terminal are increased by extending PDCCH monitoring occasions in a paging occasion, paging opportunities used for paging a specific terminal are increased by applying a short DRX cycle in this embodiment.

Figure 19:
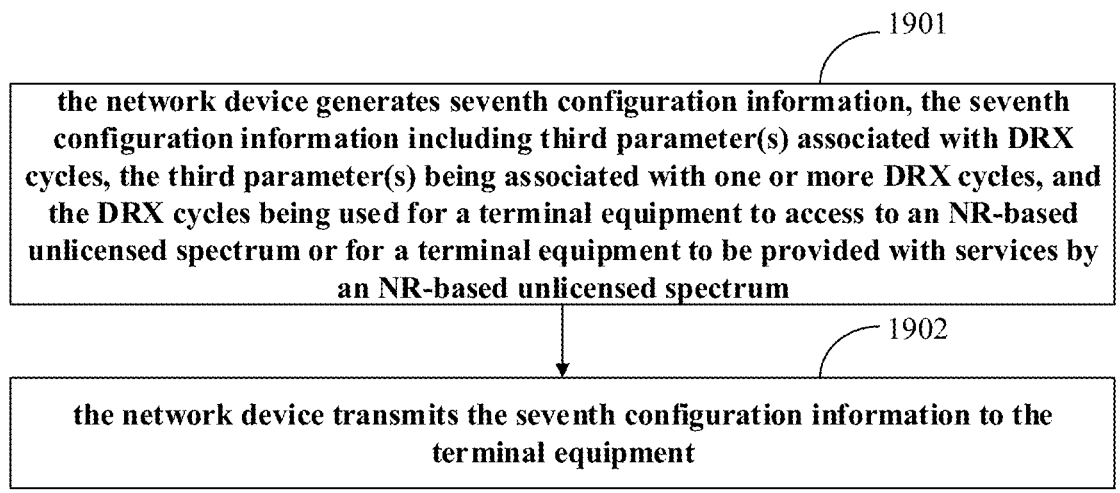
FIG. 19 is a schematic diagram of the method for configuring and determining paging opportunities of Embodiment 5.

FIG. 19 is a schematic diagram of the method for configuring and determining paging opportunities of this embodiment. As shown in FIG. 19, the method includes:

step 1901: the network device generates seventh configuration information, the seventh configuration information including third parameter(s) associated with DRX cycles, the third parameter(s) being associated with one or more DRX cycles, and the DRX cycles being used for a terminal equipment to access to an NR-based unlicensed spectrum or for a terminal equipment to be provided with services by an NR-based unlicensed spectrum; and step 1902: the network device transmits the seventh configuration information to the terminal equipment.

A manner of generating the seventh configuration information is not limited in this embodiment.

In this embodiment, the above third parameter(s) is/are identical to or different from parameters associated with a DRX cycle and based on an NR licensed spectrum, and values of the above third parameter(s) are smaller than values of the parameters associated with a DRX cycle and based on an NR licensed spectrum.

Therefore, as the value of the third parameter(s) are smaller than the values of the parameters associated with the DRX cycle and based on an NR licensed spectrum, that is, the DRX cycle becomes shorter relative to the NR-based licensed spectrum, for the terminal equipment, there exists a paging occasion in a DRX cycle, and when the DRX cycle becomes shorter, paging occasion(s) within the same time period are increased, thereby increasing paging opportunities for paging a specific terminal.

In one implementation of this embodiment, the above third parameter(s) is/are associated with a DRX cycle, and these parameters may be used when the terminal equipment resides on the NR-U or is served by the NR-U. In this implementation, the above parameters may be at least one of the following: a terminal-specific DRX cycle configured by RRC, a terminal-specific DRX cycle configured by a higher layer, and a default DRX cycle broadcast in system information.

In another implementation of this embodiment, the above third parameter(s) is/are associated with at least two DRX cycles, and time-domain lengths of the at least two DRX cycles are different. Description is given in this embodiment by taking that the third parameter(s) is/are associated with two DRX cycles of different time-domain lengths as an example, that is, a long DRX cycle and a short DRX cycle. A case where the third parameter(s) is/are associated with more than two DRX cycles is identical to the case where the third parameter(s) is/are associated with two DRX cycles, which shall not be described herein any further.

In this implementation, which DRX cycle is to be used may depend on terminal implementation, or may be indicated by the network, or may be defined in a rule.

For example, the network device may transmit first indication information to the terminal equipment, the first indication information indicating one of the above two DRX cycles, and the terminal equipment uses the DRX cycle indicated by the first indication information to access to the NR-based unlicensed spectrum or is served by the NR-based unlicensed spectrum. The above first indication information may be carried by DRX, and system information, etc., which is not limited in this embodiment.

For another example, the network device may transmit second indication information to the terminal equipment, the second indication information configuring or activating a rule switching over between the above two DRX cycles and/or determining parameters for switching over between the two DRX cycles.

The above rule may be at least one of a timer-based rule, a counter-based rule, and a threshold-based rule.

The above timer-based rule refers to switching over to another DRX cycle when a timer associated with one DRX cycle expires.

In the timer-based rule, a long to short DRX conversion timer may be maintained. When the long DRX is being used or the terminal enters an idle or inactive state, the timer is started; once the timer expires, the short DRX is used immediately or after the current DRX cycle (or a value of the timer is multiples of the long DRX cycle). And if the long DRX is currently used, the timer is (re)started when downlink transmissions on the NR-U, such as paging, DRS, and system information, etc., is received; and if the short DRX is currently used, the short DRX is used immediately or after the current DRX cycle when downlink transmissions on the NR-U, such as paging, DRS, and system information, etc., is received.

In the timer-based rule, two timers may also be maintained, namely a long-to-short DRX conversion timer and a short-to-long DRX conversion timer. When the long DRX is being used or when the terminal enters an idle or inactive state, the long-to-short DRX conversion timer is started, and once the timer expires, the short DRX is used; and when the short DRX is being used, the short-to-long DRX conversion timer is started, and once the timer expires, the long DRX is used.

The above counter-based rule refers to switching over to another DRX cycle when the number of times of using a DRX cycle reaches a maximum value.

In the counter-based rule, a maximum value of consecutive long DRX cycles may be used. Once the number of the consecutive long DRX cycles reaches the maximum value, the short DRX is used; and when downlink transmissions on the NR-U, such as paging, DRS, and system information, etc., is received, the short DRX is used immediately or after the current DRX cycle.

In the counter-based rule, a maximum value of consecutive long DRX cycles and a maximum value of consecutive short DRX cycles (the values are identical or different) may also be used. Once the number of consecutive long or short DRX cycles reaches the maximum values, the short or long DRX is used.

In the above threshold-based rule, when a channel measurement result of a DRX cycle exceeds or is less than a threshold, it is switched over to another DRX cycle.

In the threshold-based rule, the terminal equipment may perform measurement. When a measurement result reaches a threshold or a measurement time reaches T (T may be 0), DRX conversion may be performed. A measurement quantity may be load-related (such as a resource usage, channel occupancy) or interference-related (such as an SINR, RSSI), or may be a measurement quantity in the aforementioned timer-based rule or counter-based rule. And furthermore, hysteresis parameters may be used.

For example, a long-to-short DRX conversion threshold is used. The terminal performs measurement, and when a long-to-short DRX conversion threshold is reached, the short DRX is used; and when downlink transmissions on the NR-U, such as paging, DRS, and system information, etc., is received, the short DRX is used immediately or after the current DRX cycle.

For another example, a long-to-short DRX conversion threshold and a short-to-long DRX conversion threshold are used. Once the long-to-short DRX conversion threshold is reached, the short DRX is used; and once the short-to-long DRX conversion threshold is reached, the long DRX is used.

In this implementation, the above parameters for determining the switching between the two DRX cycles may include at least one of the following: values of timers with which the timer-based rule is associated, a maximum value of a DRX cycle with which the counter-based rule is associated, and a threshold with which the threshold-based rule is associated. After the parameters are configured or activated by the second indication information, the terminal equipment may switch over between the above two DRX cycles based on the foregoing rules in conjunction with the parameters.

In this embodiment, the value(s) of the above one or more DRX cycles may be defined in the Standards.

In this embodiment, if the short DRX cycle is used, the terminal equipment may monitor a paging occasion in each DRX cycle, or may monitor a PDCCH scrambled by an SI-RNTI in a paging occasion, or may monitor a PDCCH scrambled by an SI-RNTI in or out of a paging occasion. Behaviors of the terminal equipment are not limited in this embodiment.

In the method of this embodiment, paging opportunities for paging a specific terminal are increased by using the short DRX cycle. In the implementation of using only one DRX cycle, the current paging mechanism is reused to a greatest extent, including configuration of the parameters related to the paging frames and paging occasion(s), and calculation of the paging frames and paging occasion(s), etc., thereby reducing research and testing costs and lowering equipment costs. In the implementation of using the long DRX cycle and the short DRX cycle, it may be switched over between the two DRX cycles, thereby increasing paging opportunities while reducing energy consumption of the terminal.

Embodiment 6

The embodiment of this disclosure provides a method for configuring and determining paging opportunities. This method is applicable to a terminal equipment, which is processing at a terminal equipment side corresponding to the method of Embodiment 5, with contents identical to those in Embodiment 5 being not going to be described herein any further.

Figure 20:
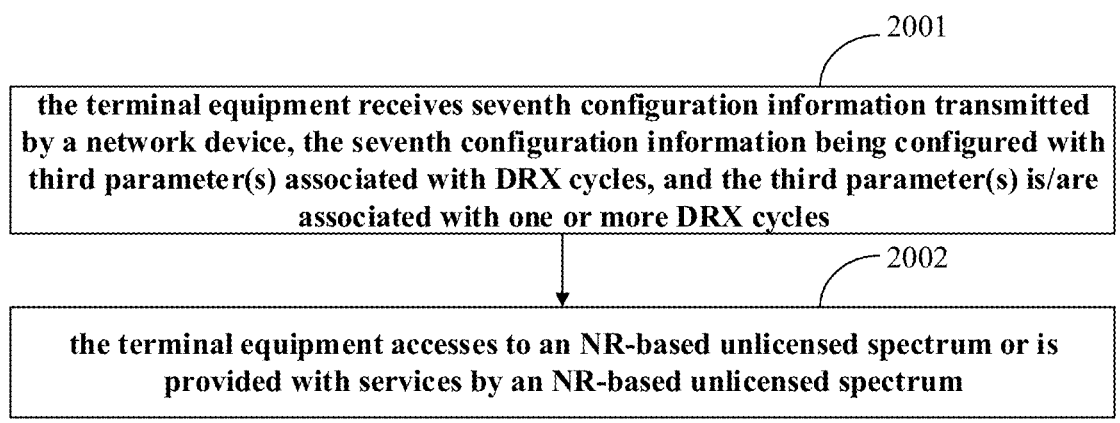
FIG. 20 is a schematic diagram of the method for configuring and determining paging opportunities of Embodiment 6.

FIG. 20 is a schematic diagram of the method for configuring and determining paging opportunities of this embodiment. As shown in FIG. 20, the method includes:

step 2001: the terminal equipment receives seventh configuration information transmitted by a network device, the seventh configuration information being configured with third parameter(s) associated with DRX cycles, and the third parameter(s) is/are associated with one or more DRX cycles; and step 2002: the terminal equipment accesses to an NR-based unlicensed spectrum or is provided with services by an NR-based unlicensed spectrum.

In this embodiment, as described in Embodiment 5, the third parameter(s) is/are identical to or different from parameters associated with a DRX cycle and based on an NR licensed spectrum, and values of the third parameter(s) are smaller than values of the parameters associated with a DRX cycle and based on an NR licensed spectrum.

In this embodiment, as described in Embodiment 5, the third parameter(s) may be associated with two DRX cycles, time-domain lengths of the two DRX cycles being different.

In one implementation, the terminal equipment may decide to use one of the above two DRX cycles to determine the paging occasion(s) according to energy consumption or paging occasion(s) of its own.

In another implementation, the terminal equipment may decide to use one of the above two DRX cycles to determine the paging occasion(s) according to an indication of the network device or a rule configured or activated by the network device.

For example, the terminal equipment may receive first indication information transmitted by the network device, the first indication information indicating one of the above two DRX cycles, the terminal equipment uses the DRX cycle indicated by the first indication information to access to the NR-based unlicensed spectrum or is served by the NR-based unlicensed spectrum, and the terminal equipment determines the paging occasion(s) by using the DRX cycle indicated by the first indication information.

For another example, the terminal equipment may receive second indication information transmitted by the network device, the second indication information configuring or activating a rule for switching over between the two DRX cycles and/or determining a parameter for switching over between the two DRX cycles, and the terminal equipment may switch over between the two DRX cycles according the rule and/or the parameter.

In this embodiment, as described in Embodiment 5, the above rule includes at least one of the following: a timer-based rule, a counter-based rule, and a threshold-based rule. If the above rule is a timer-based rule, when a timer with which a DRX cycle is associated expires, the terminal equipment switches over to another DRX cycle; if the above rule is a counter-based rule, when the number of times of using a DRX cycle reaches a maximum value, the terminal equipment switches over to another DRX cycle; and if the above rule is a threshold-based rule, when a channel measurement result of a DRX cycle exceeds a threshold, the terminal equipment switches to another DRX cycle.

In this embodiment, as described in Embodiment 5, the above parameters may include at least one of the following: values of timers with which the timer-based rule is associated, a maximum value of a DRX cycle with which the counter-based rule is associated, and a threshold with which the threshold-based rule is associated. And the terminal equipment may switch over between the above two DRX cycles according to the above parameters and the above rules.

In the method of this embodiment, the paging opportunities for paging a specific terminal are increased by using the short DRX cycle.

Embodiment 7

This embodiment provides an apparatus for configuring and determining paging opportunities, applicable to an NR-based unlicensed spectrum (NR-U) and configured in a network device. As principles of the apparatus for solving problems are similar to that of the method in Embodiment 1, reference may be made to the implementation of the method in Embodiment 1 for implementation of this apparatus, with identical contents being not going to be described herein any further.

Figure 21:
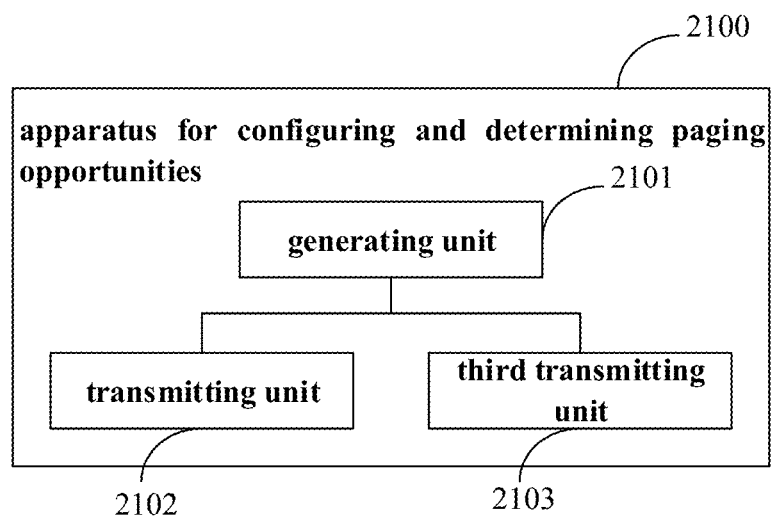
FIG. 21 is a schematic diagram of the apparatus for configuring and determining paging opportunities of Embodiment 7.

FIG. 21 is a schematic diagram of an apparatus 2100 for configuring and determining paging opportunities of this embodiment. As shown in FIG. 21, the apparatus 2100 includes a generating unit 2101 and a transmitting unit 2102. The generating unit 2101 generates first configuration information, the first configuration information including first parameter(s) associated with paging occasion(s), and the number of the paging occasion(s) associated with the first parameter(s) being greater than 4 and being an integral multiple of 4, and the transmitting unit 2102 transmits the first configuration information to a terminal equipment.

In this embodiment, the above first parameter(s) may include at least one of the following: a parameter indicating the number of paging occasion(s) associated with a paging frame, and a parameter indicating a first PDCCH monitoring occasion of a paging occasion.

In this embodiment, as shown in FIG. 21, the apparatus 2100 may further include a third transmitting unit 2103 configured to transmit third configuration information to the terminal equipment, the third configuration information including a maximum number (Y) of paging occasion(s) that the terminal equipment may monitor, and indices of paging occasion(s) of the terminal equipment are determined at least by the first parameter and the maximum number.

Figure 22:
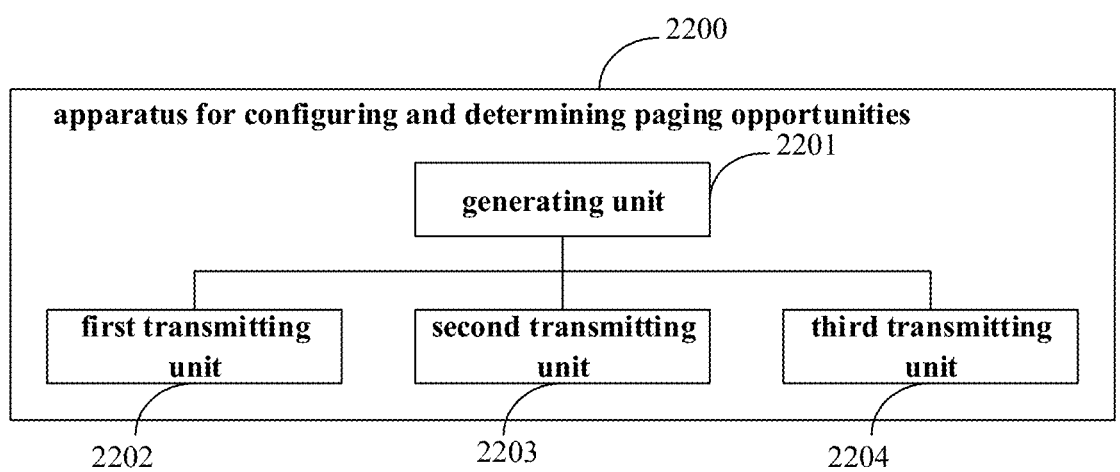
FIG. 22 is another schematic diagram of the apparatus for configuring and determining paging opportunities of Embodiment 7.

FIG. 22 is another schematic diagram of an apparatus 2200 for configuring and determining paging opportunities of this embodiment. As shown in FIG. 22, the apparatus 2200 includes a generating unit 2201 and a first transmitting unit 2202. The generating unit 2201 generates first configuration information, the first configuration information including first parameter(s) associated with paging occasion(s), and the number of the paging occasion(s) associated with the first parameter(s) is 1, or 2, or 4, and the first transmitting unit 2202 transmits the first configuration information to a terminal equipment, wherein the number of paging occasion(s) configured by the network device is determined at least by the first parameter(s) and a first scaling configured by the network device or a second scaling determined by the terminal equipment.

In this embodiment, as shown in FIG. 22, the apparatus 2200 may further include:

a second transmitting unit 2203 configured to transmit second configuration information to the terminal equipment, the second configuration information including the first scaling, and the number of paging occasion(s) configured by the network device is determined by at least the above first parameter and the first scaling.

In this embodiment, as shown in FIG. 22, the apparatus 2200 may further include:

a third transmitting unit 2204 configured to transmit third configuration information to the terminal equipment, the third configuration information including a maximum number (Y) of paging occasion(s) that the terminal equipment may monitor, and the indices of the paging occasion(s) configured by the terminal equipment are determined at least by the first parameter and the maximum number (Y).

According to the apparatus of this embodiment, paging opportunities are increased by increasing paging occasion(s) in a paging frame.

Embodiment 8

This embodiment provides an apparatus for configuring and determining paging opportunities, applicable to an NR-based unlicensed spectrum (NR-U) and configured in a terminal equipment. As principles of the apparatus for solving problems are similar to that of the method in Embodiment 2, reference may be made to the implementation of the method in Embodiment 2 for implementation of this apparatus, with identical contents being not going to be described herein any further.

Figure 23:
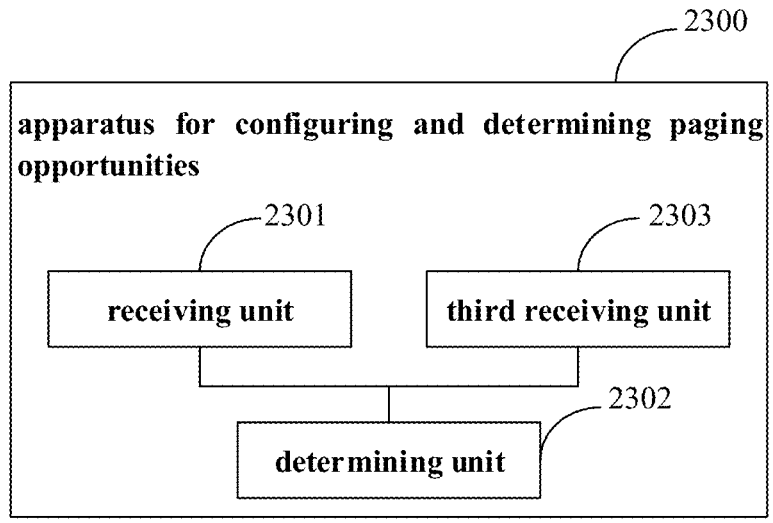
FIG. 23 is a schematic diagram of the apparatus for configuring and determining paging opportunities of Embodiment 8.

FIG. 23 is a schematic diagram of an apparatus 2300 for configuring and determining paging opportunities of this embodiment. As shown in FIG. 23, the apparatus 2300 includes a receiving unit 2301 and a determining unit 2302. The receiving unit 2301 receives first configuration information transmitted by a network device, the first configuration information including first parameter(s) associated with paging occasion(s), and the number of the paging occasion(s) associated with the first parameter(s) being greater than 4 and being an integral multiple of 4, and the determining unit 2302 determines indices of paging occasions of the terminal equipment according to the first parameter(s).

In this embodiment, the above first parameter(s) include at least one of the following: a parameter indicating the number of paging occasion(s) associated with a paging frame, and a parameter indicating a first PDCCH monitoring occasion of a paging occasion.

In this embodiment, as shown in FIG. 23, the apparatus 2300 may further include:

a third receiving unit 2303 configured to receive third configuration information transmitted by the network device, the third configuration information including the maximum number (Y) of paging occasion(s) that the terminal equipment may monitor, and the determining unit 2302 determines indices of the paging occasion of the terminal equipment according to the above first parameter and the maximum number (Y).

Figure 24:
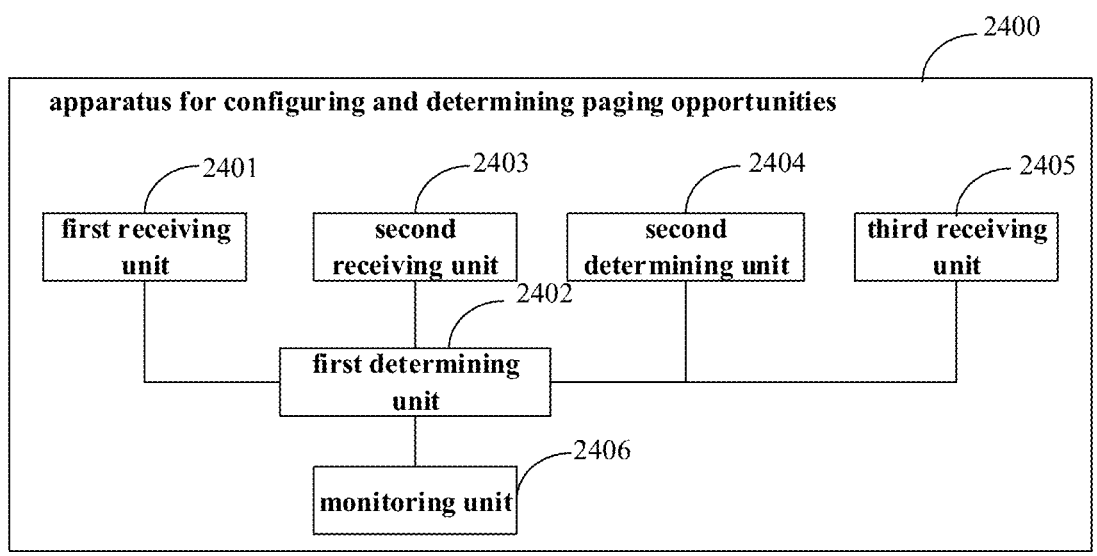
FIG. 24 is another schematic diagram of the apparatus for configuring and determining paging opportunities of Embodiment 8.

FIG. 24 is a schematic diagram of an apparatus 2400 for configuring and determining paging opportunities of this embodiment. As shown in FIG. 24, the apparatus 2400 includes a first receiving unit 2401 and a first determining unit 2402. The first receiving unit 2401 receives first configuration information transmitted by a network device, the first configuration information including first parameter(s) associated with paging occasion(s), and the number of the paging occasion(s) associated with the first parameter(s) is 1, or 2, or 4, and the first determining unit 2402 determines indices of paging occasion(s) of the terminal equipment according to the first parameter(s) and a first scaling configured by the network device or a second scaling determined by the terminal equipment; wherein the number of paging occasion(s) configured by the network device is determined according to the first parameter(s) and the first scaling configured by the network device or the second scaling determined by the terminal equipment.

In this embodiment, as shown in FIG. 24, the apparatus 2400 may further include:

a second receiving unit 2403 configured to receive second configuration information transmitted by the network device, the second configuration information including the above first scaling, and the first determining unit 2402 determines indices of the paging occasion of the terminal equipment according to the above first parameter and the first scaling.

In this embodiment, as shown in FIG. 24, the apparatus 2400 may further include:

a second determining unit 2404 configured to determine the above second scaling based on a measurement result related interference or load; and the first determining unit 2402 determines the index of the paging occasion(s) of the terminal equipment according to the above first parameter and the second scaling.

In this embodiment, the measurement result related interference or load may include at least one of the following: a channel occupancy ratio, a channel busy ratio, a rate of success or failure of channel sensing and a rate of number of times of success or failure of channel sensing.

In this embodiment, as shown in FIG. 24, the apparatus 2400 may further include:

a third receiving unit 2405 configured to receive third configuration information transmitted by the network device, the third configuration information including a maximum number (Y) of paging occasion(s) that the terminal equipment may monitor, and the first determining unit 2402 determines the indices of the paging occasion(s) of the terminal equipment according to the above first parameter and the maximum number (Y).

In one implementation, the first determining unit 2402 may determine the indices of the paging occasion(s) of the terminal equipment according a formula as below:

$$i\_s \bmod (ns/Y) = \mathrm{floor}(UE\_ID/N) \bmod (ns/Y);$$

where, $i\_s$ is an index of the paging occasion of the terminal equipment, $ns$ is the first parameter, Y is the maximum number, UE_ID is an ID of the terminal equipment, and N is a total number of paging frames in a DRX cycle of the terminal equipment.

In another implementation, the first determining unit 2402 may determine the indices of the paging occasion(s) of the terminal equipment according a formula as below:

$$(i\_s - n)/Y = \mathrm{floor}(UE\_ID/N) \bmod (ns/Y);$$

where, n is a variable, denoting a sequence number of a paging occasion of the terminal equipment, i_s is an index of a paging occasion of the terminal equipment, corresponding to the sequence number n, ns is the above first parameter, Y is the above maximum number, UE_ID is identification of the terminal equipment, and N is a total number of paging frames in a DRX cycle of the terminal equipment.

In a further implementation, the first determining unit 2402 may determine the indices of the paging occasion(s) of the terminal equipment according a formula as below:

$$i\_s=\text{floor}(UE\_ID/N) \bmod (ns/Y),$$

$$i\_s+1+(n-1)*(ns/Y);$$

where, i_s+1 is an index of a first paging occasion of the terminal equipment, i_s+1+(n−1)*(ns/Y) is an index of the n-th paging occasion of the terminal equipment, ns is the above first parameter, Y is the above maximum number, n<=Y, UE_ID is identification of the terminal equipment, and N is a total number of paging frames in a DRX cycle of the terminal equipment.

In still another implementation, the first determining unit 2402 may determine the indices of the paging occasion(s) of the terminal equipment according a formula as below:

$$i\_s/Y=\text{floor}(UE\_ID/N) \bmod (ns/Y),$$

$$i\_s+n;$$

where, i_s is an index of a first paging occasion of the terminal equipment, i_s+n is the index of the n-th paging occasion of the terminal equipment, ns is the above first parameter, Y is the above maximum number, n<=Y, UE_ID is identification of the terminal equipment, and N is a total number of paging frames in a DRX cycle of the terminal equipment.

In this embodiment, as shown in FIG. 24, the apparatus 2400 may further include:

a monitoring unit 2406 configured to monitor paging on a part of paging occasions that are able to be monitored, until paging is received or the network device indicates to stop monitoring or all paging occasions are monitored, or configured to monitor paging on all paging occasions that are able to be monitored.

In this embodiment, the number of the indices of the paging occasion(s) of the terminal equipment is at least one, and when the number of the indices of the paging occasion(s) of the terminal equipment is at least two, the indices of the paging occasion(s) of the terminal equipment are discrete or centralized in the time domain.

According to the apparatus of this embodiment, paging opportunities are increased by increasing paging occasion(s) in a paging frame.

Embodiment 9

This embodiment provides an apparatus for configuring and determining paging opportunities, applicable to an NR-based unlicensed spectrum (NR-U) and configured in a network. As principles of the apparatus for solving problems are similar to that of the method in Embodiment 3, reference may be made to the implementation of the method in Embodiment 3 for implementation of this apparatus, with identical contents being not going to be described herein any further.

Figure 25:
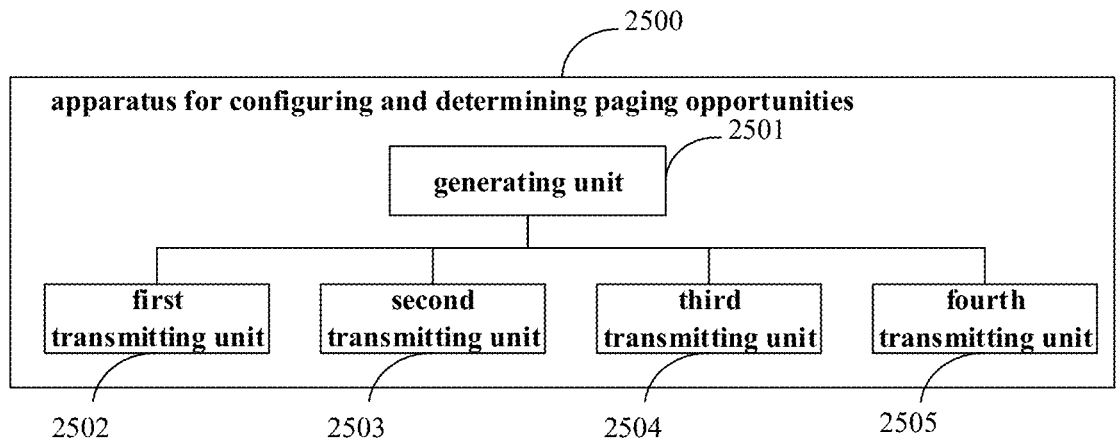
FIG. 25 is a schematic diagram of the apparatus for configuring and determining paging opportunities of Embodiment 9.

FIG. 25 is a schematic diagram of an apparatus 2500 for configuring and determining paging opportunities of this embodiment. As shown in FIG. 25, the apparatus 2500 includes a generating unit 2501 and a first transmitting unit 2502. The generating unit 2501 generates fourth configuration information, the fourth configuration information including second parameter(s) associated with paging occasion(s), a paging occasion associated with the second parameter(s) including a first number of downlink control channel monitoring occasions or a second number of sets of downlink control channel monitoring occasions, the first number being related to synchronization signal blocks (SSBs), and the first transmitting unit 2502 transmits the fourth configuration information.

In this embodiment, in a case where the paging occasion associated with the second parameter(s) includes the first number of downlink control channel monitoring occasions, the first number is at least one of the following: the number of actually transmitted SSBs (S) determined according to information provided in a first system information block (SIB1), multiples (xS) of the number of actually transmitted SSBs determined according to information provided in a first system information block (SIB1), a number (S') determined according to the number of SSBs that is determined according to information provided by a network, and multiples of a number (xS') determined according to the number of SSBs that is determined according to information provided by a network.

In this embodiment, in a case where the paging occasion associated with the second parameter(s) includes the second number of sets of downlink control channel monitoring occasions, the second parameter(s) include at least one of the following: values of a second number of starting downlink control channel monitoring occasions of a paging occasion, and a second number of values of one starting downlink control channel monitoring occasion of a paging occasion; wherein in the time domain, the sets of downlink control channel monitoring occasion sets are associated with different paging occasions in a centralized way, or the sets of downlink control channel monitoring occasions are sequentially associated with different paging occasions in a discrete way.

In this embodiment, as shown in FIG. 25, the apparatus 2500 may further include:

a second transmitting unit 2503 configured to, in a case where the paging occasion associated with the second parameter(s) includes the second number of sets of downlink control channel monitoring occasions, transmit fifth configuration information to the terminal equipment, the fifth configuration information including intervals between the second number of sets of downlink control channel monitoring occasions within the paging occasion associated with the second parameter(s).

In this embodiment, as shown in FIG. 25, the apparatus 2500 may further include:

a third transmitting unit 2504 configured to transmit sixth configuration information to the terminal equipment, the sixth configuration information being configured with the above second number.

In one implementation of this embodiment, durations of all downlink control channels may be greater than or equal to 4 symbols.

In another implementation of this embodiment, a duration of at least one downlink control channel monitoring occasion within one paging occasion associated with the second parameter(s) is greater than or equal to 4 symbols.

In this embodiment, as shown in FIG. 25, the apparatus 2500 may further include:

a fourth transmitting unit 2505 configured to transmit third configuration information to the terminal equipment, the third configuration information including a maximum number (Y) of paging occasion(s) that the terminal equipment may monitor, and indices of paging occasion(s) of the terminal equipment are determined at least by the maximum number (Y).

According to this embodiment, paging opportunities for paging a specific terminal are increased by extending the PDCCH monitoring occasions in a paging occasion (PO).

Embodiment 10

This embodiment provides an apparatus for configuring and determining paging opportunities, applicable to an NR-based unlicensed spectrum (NR-U) and configured in a terminal equipment. As principles of the apparatus for solving problems is similar to that of the method in Embodiment 4, reference may be made to the implementation of the method in Embodiment 4 for implementation of this apparatus, with identical contents being not going to be described herein any further.

Figure 26:
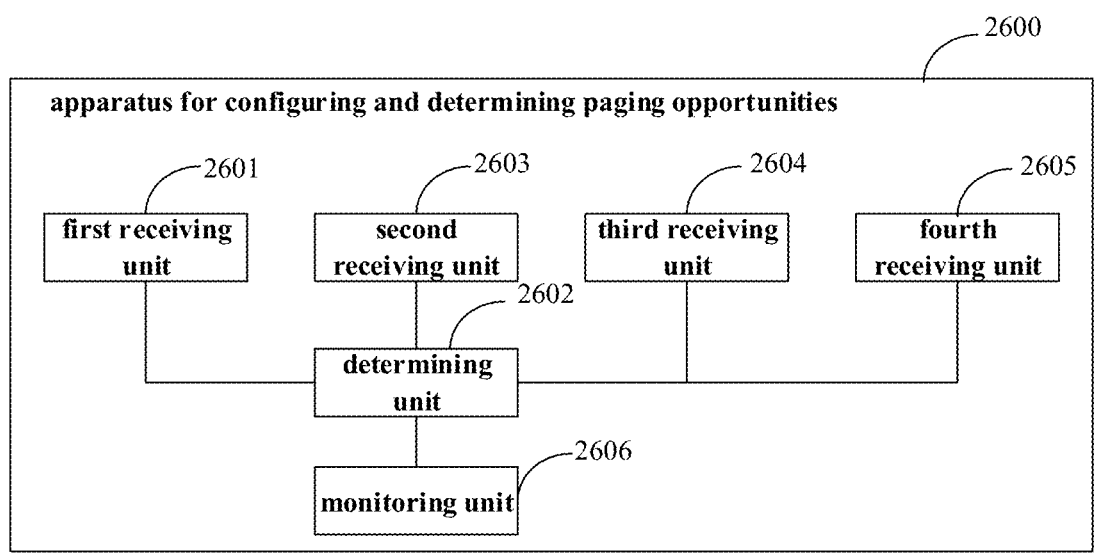
FIG. 26 is a schematic diagram of the apparatus for configuring and determining paging opportunities of Embodiment 10.

FIG. 26 is a schematic diagram of an apparatus 2600 for configuring and determining paging opportunities of this embodiment. As shown in FIG. 26, the apparatus 2600 includes a first receiving unit 2601 and a determining unit 2602. The first receiving unit 2601 receives fourth configuration information transmitted by a network device, the fourth configuration information including second parameter(s) associated with paging occasion(s), a paging occasion associated with the second parameter(s) including a first number of downlink control channel monitoring occasions or a second number of sets of downlink control channel monitoring occasions, the first number being related to synchronization signal blocks (SSBs), and the determining unit 2602 determines paging opportunities of the terminal equipment by using the second parameter(s).

In this embodiment, when the paging occasion associated with the second parameter(s) includes the first number of downlink control channel monitoring occasions, the first number is at least one of the following: the number of actually transmitted SSBs (S) determined according to information provided in a first system information block (SIB1), multiples (xS) of the number of actually transmitted SSBs determined according to information provided in a first system information block (SIB1), a number (S') determined according to the number of SSBs that is determined according to information provided by a network, and multiples (xS') of a number determined according to the number of SSBs that is determined according to information provided by a network.

In this embodiment, when the paging occasion associated with the second parameter(s) includes the second number of sets of downlink control channel monitoring occasions, the second parameter(s) include at least one of the following: values of a second number of starting downlink control channel monitoring occasions of a paging occasion, and a second number of values of one starting downlink control channel monitoring occasion of a paging occasion; wherein in the time domain, the sets of downlink control channel monitoring occasion sets are associated with different paging occasions in a centralized way, or the sets of downlink control channel monitoring occasions are sequentially associated with different paging occasions in a discrete way.

In this embodiment, as shown in FIG. 26, the apparatus 2600 may further include:

a second receiving unit 2603 configured to receive fifth configuration information transmitted by the network device, the fifth configuration information including intervals between a second number of sets of downlink control channel monitoring occasions within a paging occasion associated with the second parameter(s), and the determining unit 2602 determines paging opportunities of the terminal equipment by using the second parameter(s) and the intervals.

In this embodiment, as shown in FIG. 26, the apparatus 2600 may further include:

a third receiving unit 2604 configured to receive sixth configuration information transmitted by the network device, the sixth configuration information including the second number, and the determining unit 2602 determines paging opportunities of the terminal equipment by using the second parameter(s), the second number and the intervals.

In this embodiment, the determining unit 2602 may determine a position of a starting downlink control channel monitoring occasion of a first paging occasion of the terminal equipment by using the second parameter(s).

In one implementation, as shown in FIG. 26, the apparatus 2600 may further include:

a fourth receiving unit 2605 configured to receive third configuration information transmitted by the network device, the third configuration information including the maximum number (Y) of paging occasion(s) that are able to be monitored by the terminal equipment, and the determining unit 2602 determines the position of the starting downlink control channel monitoring occasion of a first paging occasion of the terminal equipment by using second parameter(s) and the maximum number (Y).

For example, the determining unit 2602 determines the position according to a relationship as below:

the number of the starting downlink control channel monitoring occasions mod p=an (i_s+1)-th value of firstPDCCH-MonitoringOccasionOfPO;

where, p=ns/Y, i_s+1 is the positions of the starting downlink control channel monitoring occasions of the first paging occasion of the terminal equipment, ns and firstPDCCH-MonitoringOccasionOfPO are the second parameter(s), and Y is the maximum number.

In this embodiment, a duration of at least one downlink control channel monitoring occasion within at least one paging occasion associated with the second parameter(s) may be greater than or equal to 4 symbols.

In this embodiment, as shown in FIG. 26, the apparatus 2600 may further include:

a monitoring unit 2606 configured to monitor paging on a part of paging occasions that are able to be monitored, until paging is received or the network device indicates to stop monitoring or all paging occasions are monitored, or configured to monitor paging on all paging occasions that are able to be monitored.

According to this embodiment, paging opportunities for paging a specific terminal are increased by extending the PDCCH monitoring occasions in a paging occasion (PO).

Embodiment 11

This embodiment provides an apparatus for configuring and determining paging opportunities, configured in a network device. As principles of the apparatus for solving problems is similar to that of the method in Embodiment 5, reference may be made to the implementation of the method in Embodiment 5 for implementation of this apparatus, with identical contents being not going to be described herein any further.

Figure 27:
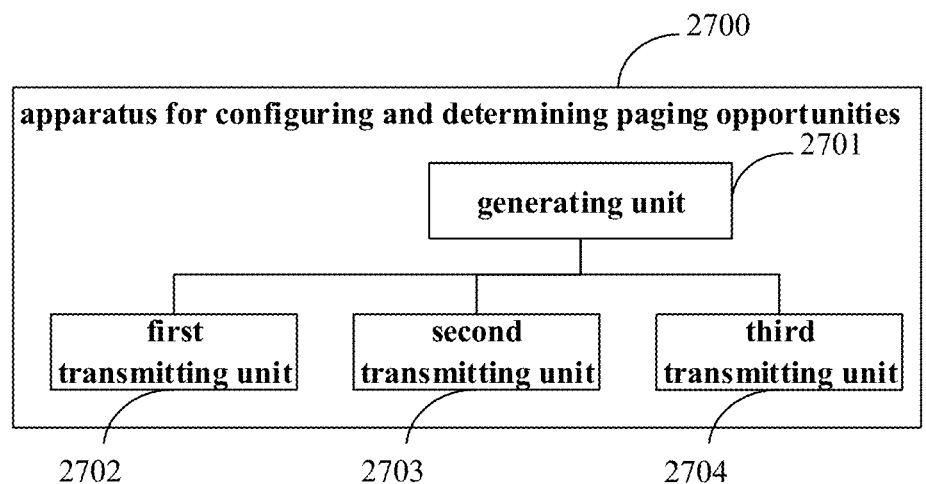
FIG. 27 is a schematic diagram of the apparatus for configuring and determining paging opportunities of Embodiment 11.

FIG. 27 is a schematic diagram of an apparatus 2700 for configuring and determining paging opportunities of this embodiment. As shown in FIG. 27, the apparatus 2700 may include a generating unit 2701 and a first transmitting unit 2702. The generating unit 2701 generates seventh configuration information, the seventh configuration information including third parameter(s) associated with DRX cycles, the third parameter(s) being associated with one or more DRX cycles, and the DRX cycles are used for a terminal equipment to access to an NR-based unlicensed spectrum or for a terminal equipment to be provided with services by an NR-based unlicensed spectrum, and the first transmitting unit 2702 transmits the seventh configuration information to the terminal equipment.

In this embodiment, the third parameter(s) is/are identical to or different from parameters associated with a DRX cycle and based on an NR licensed spectrum, and values of the third parameter(s) are smaller than values of the parameters associated with a DRX cycle and based on an NR licensed spectrum.

In one implementation of this embodiment, the third parameter(s) is/are associated with two DRX cycles, and time-domain lengths of the two DRX cycles are different.

In this implementation, as shown in FIG. 27, the apparatus 2700 may further include:

a second transmitting unit 2703 configured to transmit first indication information to the terminal equipment, the first indication information indicating one of the two DRX cycles, and the terminal equipment uses the DRX cycle indicated by the first indication information to access to the NR-based unlicensed spectrum or is served by the NR-based unlicensed spectrum.

In this implementation, as shown in FIG. 27, the apparatus 2700 may further include:

a third transmitting unit 2704 configured to transmit second indication information to the terminal equipment, the second indication information configuring or activating a rule switching over between the above two DRX cycles and/or determining parameters for switching over between the two DRX cycles.

In this implementation, the above rule may include at least one of a timer-based rule, a counter-based rule, and a threshold-based rule.

The above timer-based rule refers to switching over to another DRX cycle when a timer associated with one DRX cycle expires. The above counter-based rule refers to switching over to another DRX cycle when the number of times of using a DRX cycle reaches a maximum value. And the above threshold-based rule refers to that it is switched over to another DRX cycle when a channel measurement result of a DRX cycle exceeds or is less than a threshold.

In this implementation, the above parameter may include at least one of the following: values of timers associated with a timer-based rule, a maximum value of a DRX cycle associated with a counter-based rule, and a threshold associated with a threshold-based rule.

In this embodiment, the values of the above one or more DRX cycles may be defined in the Standards.

According to this embodiment, paging opportunities used for paging a specific terminal are increased by applying a short DRX cycle.

Embodiment 12

This embodiment provides an apparatus for configuring and determining paging opportunities, configured in a terminal equipment. As principles of the apparatus for solving problems are similar to that of the method in Embodiment 6, reference may be made to the implementation of the method in Embodiment 6 for implementation of this apparatus, with identical contents being not going to be described herein any further.

Figure 28:
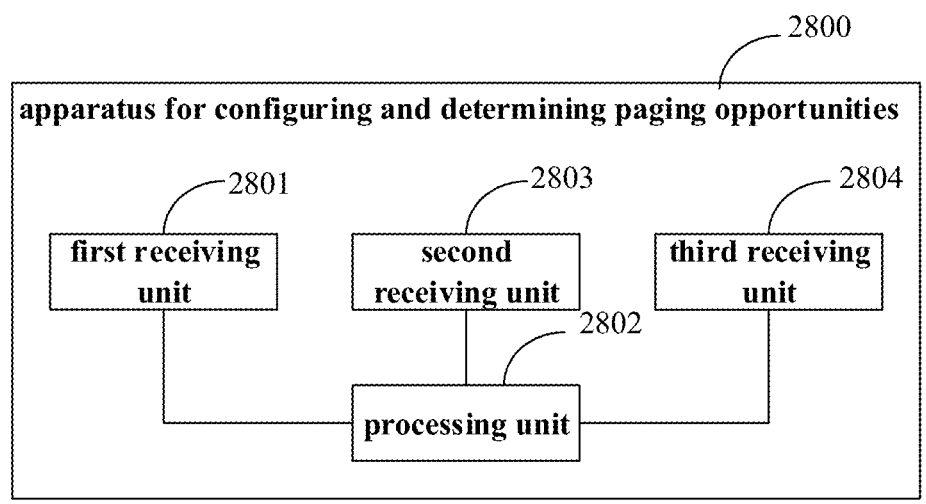
FIG. 28 is a schematic diagram of the apparatus for configuring and determining paging opportunities of Embodiment 12.

FIG. 28 is a schematic diagram of an apparatus 2800 for configuring and determining paging opportunities of this embodiment. As shown in FIG. 28, the apparatus 2800 includes a first receiving unit 2801 and a processing unit 2802. The first receiving unit 2801 receives seventh configuration information transmitted by a network device, the seventh configuration information being configured with third parameter(s) associated with DRX cycles, the third parameter(s) being associated with one or more DRX cycles, and the processing unit 2802 accesses to an NR-based unlicensed spectrum or to be provided with services by an NR-based unlicensed spectrum according to the one or more DRX cycles.

In this embodiment, the third parameter(s) is/are identical to or different from parameters associated with a DRX cycle and based on an NR licensed spectrum, and values of the third parameter(s) are smaller than values of the parameters associated with a DRX cycle and based on an NR licensed spectrum.

In one implementation of this embodiment, the third parameter(s) is/are associated with two DRX cycles, and time-domain lengths of the two DRX cycles are different.

In this implementation, the processing unit 2802 may decide to use one of the two DRX cycles to determine the paging occasion(s) according to energy consumption or paging occasion(s) of the terminal equipment.

In this implementation, as shown in FIG. 28, the apparatus 2800 may further include:

a second receiving unit 2803 configured to receive first indication information transmitted by the network device, the first indication information indicating one of the two DRX cycles, and the processing unit 2802 accesses to the NR-based unlicensed spectrum or is provided with services by the NR-based unlicensed spectrum by using the DRX cycle indicated by the first indication information; and the processing unit 2802 determines the paging occasion(s) by using the DRX cycle indicated by the first indication information.

In this implementation, as shown in FIG. 28, the apparatus 2800 may further include:

a third receiving unit 2804 configured to receive second indication information transmitted by the network device, the second indication information configuring or activating a rule for switching over between the two DRX cycles and/or determining a parameter for switching over between the two DRX cycles; and the processing unit 2802, according the rule and/or the parameter, makes the terminal equipment switch over between the two DRX cycles.

In this implementation, the rule may include at least one of the following: a timer-based rule, a counter-based rule, and a threshold-based rule.

In this implementation, if the rule is a timer-based rule, when a timer with which a DRX cycle is associated expires, the terminal equipment switches over to another DRX cycle; if the rule is a counter-based rule, when the number of times of using a DRX cycle reaches a maximum value, the terminal equipment switches over to another DRX cycle; and if the rule is a threshold-based rule, when a channel measurement result of a DRX cycle exceeds a threshold, the terminal equipment switches to another DRX cycle.

In this embodiment, the parameters may include at least one of the following: values of timers with which the timer-based rule is associated, a maximum value of a DRX cycle with which the counter-based rule is associated, and a threshold with which the threshold-based rule is associated. And the terminal equipment may switch over between the above two DRX cycles according to the above parameters and the above rules.

According to this embodiment, paging opportunities used for paging a specific terminal are increased by applying a short DRX cycle.

Embodiment 13

The embodiment of this disclosure provides a terminal equipment, including the apparatus described in Embodiment 8 or 10 or 12.

Figure 29:
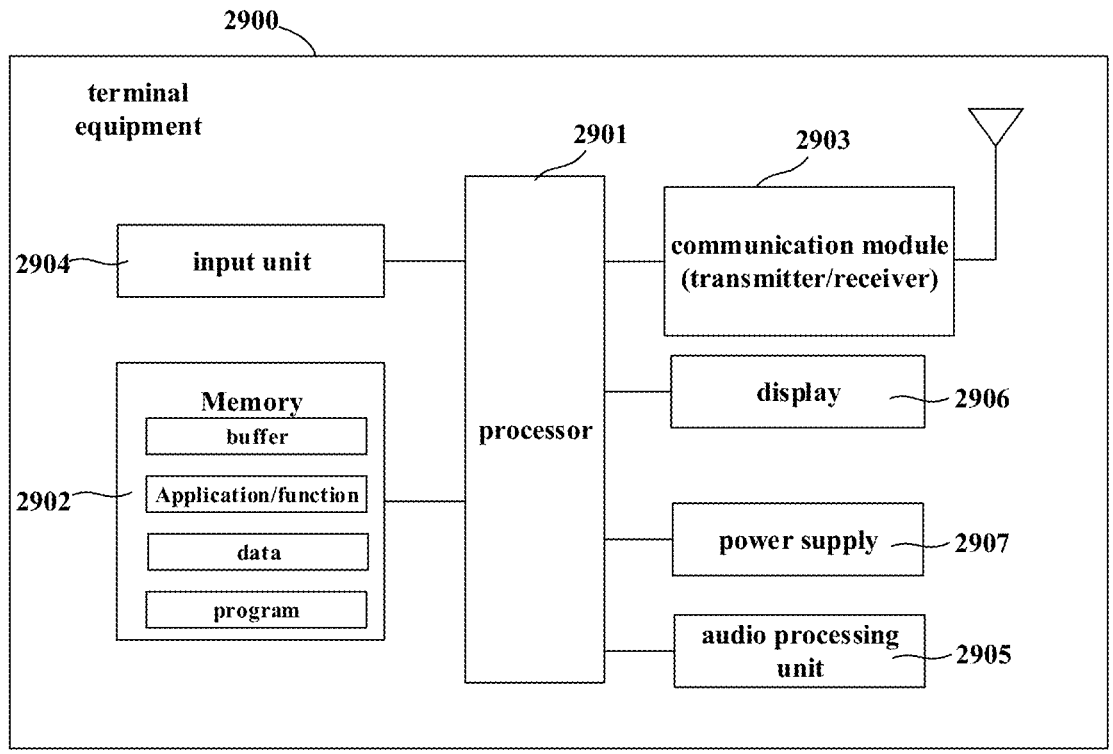
FIG. 29 is a schematic diagram of the terminal equipment of Embodiment 13.

FIG. 29 is a schematic diagram of the terminal equipment of the embodiment of this disclosure. As shown in FIG. 29, a terminal equipment 2900 may include a central processor 2901 and a memory 2902, the memory 2902 being coupled to the central processor 2901. It should be noted that this figure is illustrative only, and other types of structures may also be used, so as to supplement or replace this structure and achieve a telecommunications function or other functions.

In one implementation, the functions of the apparatus described in Embodiment 8 or 10 or 12 may be integrated into the central processor 2901, and the central processor 2901 executes functions of the apparatus described in Embodiment 8 or 10 or 12. The functions of the apparatus described in Embodiment 8 or 10 or 12 are incorporated herein, and shall not be described herein any further.

In another implementation, the apparatus described in Embodiment 8 or 10 or 12 and the central processor 2901 may be configured separately; for example, the apparatus described in Embodiment 8 or 10 or 12 may be configured as a chip connected to the central processor 2901, and the functions of the apparatus described in Embodiment 8 or 10 or 12 are executed under control of the central processor 2901.

As shown in FIG. 29, the terminal equipment 2900 may further include a communication module 2903, an input unit 2904, an audio processing unit 2905, a display 2906, and a power supply 2907, etc. It should be noted that the terminal equipment 2900 does not necessarily include all the parts shown in FIG. 29. Furthermore, the terminal equipment 2900 may include parts not shown in FIG. 29, and the related art may be referred to.

As shown in FIG. 29, the central processor 2901 is sometimes referred to as a controller or an operational control, which may include a microprocessor or other processor devices and/or logic devices. The central processor 2901 receives input and controls operations of components of the terminal equipment 2900.

The memory 2902 may be, for example, one or more of a buffer memory, a flash memory, a hard drive, a mobile medium, a volatile memory, a nonvolatile memory, or other suitable devices, which may store various data, etc., and furthermore, store programs executing related information. And the central processor 2901 may execute programs stored in the memory 2902, so as to realize information storage or processing, etc. Functions of other parts are similar to those of the related art, which shall not be described herein any further. The parts of the terminal equipment 2900 may be realized by specific hardware, firmware, software, or any combination thereof, without departing from the scope of this disclosure.

With the terminal equipment of this embodiment, paging opportunities are increased.

Embodiment 14

The embodiment of this disclosure provides a network device, including the apparatus described in Embodiment 7 or 9 or 11.

Figure 30:
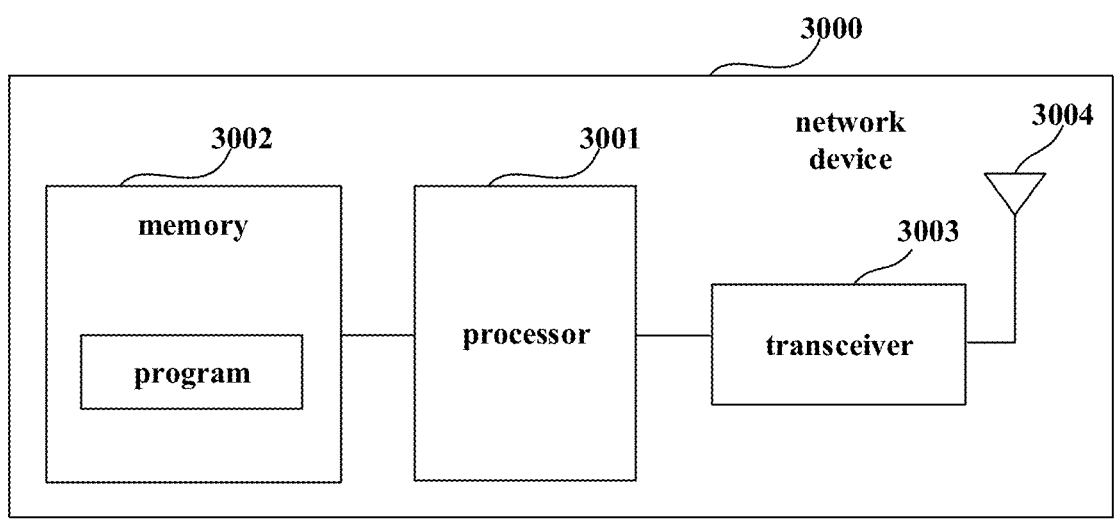
FIG. 30 is a schematic diagram of the network device of Embodiment 14.

FIG. 30 is a schematic diagram of a structure of one implementation of the network device of the embodiment of this disclosure. As shown in FIG. 30, a network device 3000 may include a central processor (CPU) 3001 and a memory 3002, the memory 3002 being coupled to the central processor 3001. The memory 3002 may store various data, and furthermore, it may store a program for data processing, and execute the program under control of the central processor 3001, so as to receive various information transmitted by a terminal equipment, and transmit various information to the terminal equipment.

In one implementation, the functions of the apparatus described in Embodiment 7 or 9 or 11 may be integrated into the central processor 3001, and the central processor 3001 executes functions of the apparatus described in Embodiment 7 or 9 or 11. The functions of the apparatus described in Embodiment 7 or 9 or 11 are incorporated herein, and shall not be described herein any further.

In another implementation, the apparatus described in Embodiment 7 or 9 or 11 and the central processor 3001 may be configured separately; for example, the apparatus described in Embodiment 7 or 9 or 11 may be configured as a chip connected to the central processor 3001, and the functions of the apparatus described in Embodiment 7 or 9 or 11 are executed under control of the central processor 3001.

Furthermore, as shown in FIG. 30, the network device 3000 may include a transceiver 3003, and an antenna 3004, etc. Functions of the above components are similar to those in the related art, and shall not be described herein any further. It should be noted that the network device 3000 does not necessarily include all the parts shown in FIG. 30. Furthermore, the network device 3000 may include parts not shown in FIG. 30, and the related art may be referred to.

With the network device of this embodiment, paging opportunities may be increased.

Embodiment 15

The embodiment of this disclosure provides a communication system, including a network device and a terminal equipment. The network device is, for example, the network device 3000 described in Embodiment 14, and the terminal equipment is, for example, the terminal equipment 2900 described in Embodiment 13.

In this embodiment, the terminal equipment is, for example, a UE served by a gNB, and may include conventional compositions and functions of a terminal equipment in addition to the functions of the apparatus described in Embodiment 8 or 10 or 12, which are as described in Embodiment 13, and shall not be described herein any further.

In this embodiment, the network device may be, for example, a gNB in NR, and may include conventional compositions and functions of a network device in addition to the functions of the apparatus described in Embodiment 7 or 9 or 11, which are as described in Embodiment 14, and shall not be described herein any further.

With the communication system of this embodiment, paging opportunities may be increased.

An embodiment of this disclosure provides a computer readable program, which, when executed in a terminal equipment, will cause a computer to carry out the method described in Embodiment 2 or 4 or 6 in the terminal equipment.

An embodiment of this disclosure provides a storage medium storing a computer readable program, which will cause a computer to carry out the method described in Embodiment 2 or 4 or 6 in a terminal equipment.

An embodiment of this disclosure provides a computer readable program, which, when executed in a network device, will cause a computer to carry out the method described in Embodiment 1 or 3 or 5 in the network device.

An embodiment of this disclosure provides a storage medium storing a computer readable program, which will cause a computer to carry out the method described in Embodiment 1 or 3 or 5 in a network device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further disclosed.

1. An apparatus for configuring and determining paging opportunities, configured in a network device, the apparatus including:

a generating unit configured to generate first configuration information, the first configuration information including first parameter(s) associated with paging occasion(s), and the number of the paging occasion(s) associated with the first parameter(s) is greater than 4 and is an integral multiple of 4; and a transmitting unit configured to transmit the first configuration information to a terminal equipment.

2. An apparatus for configuring and determining paging opportunities, configured in a network device, the apparatus including:

a generating unit configured to generate first configuration information, the first configuration information including first parameter(s) associated with paging occasion(s), and the number of the paging occasion(s) associated with the first parameter(s) is 1, or 2, or 4; and a first transmitting unit configured to transmit the first configuration information to a terminal equipment, wherein the number of paging occasion(s) configured by the network device is determined at least by the first parameter(s) and a first scaling configured by the network device or a second scaling determined by the terminal equipment.

3. The apparatus according to supplement 1 or 2, wherein the first parameter(s) include at least one of the following:

a parameter indicating the number of paging occasion(s) associated with a paging frame; and a parameter indicating a first PDCCH monitoring occasion of paging occasion(s).

4. The apparatus according to supplement 2, wherein the apparatus further includes:

a second transmitting unit configured to transmit second configuration information to the terminal equipment, the second configuration information including the first scaling, and the number of paging occasion(s) configured by the network device is determined by at least the first parameter and the first scaling.

5. The apparatus according to any one of supplements 1-4, wherein the apparatus further includes:

a third transmitting unit configured to transmit third configuration information to the terminal equipment, the third configuration information including a maximum number (Y) of paging occasion(s) that the terminal equipment may monitor, and an index of a paging occasion of the terminal equipment is determined at least by the first parameter and the maximum number (Y).

6. The apparatus according to any one of supplements 1-5, wherein the apparatus is applicable to an NR-based unlicensed spectrum (NR-U).

7. An apparatus for configuring and determining paging opportunities, configured in a terminal equipment, the apparatus including:

a receiving unit configured to receive first configuration information transmitted by a network device, the first configuration information including first parameter(s) associated with paging occasion(s), and the number of the paging occasion(s) associated with the first parameter(s) is greater than 4 and is an integral multiple of 4; and a determining unit configured to determine an index of a paging occasion of the terminal equipment by using the first parameter(s).

8. An apparatus for configuring and determining paging opportunities, configured in a terminal equipment, the apparatus including:

a first receiving unit configured to receive first configuration information transmitted by a network device, the first configuration information including first parameter(s) associated with paging occasion(s), and the number of the paging occasion(s) associated with the first parameter(s) is 1, or 2, or 4; and a first determining unit configured to determine indices of paging occasion(s) of the terminal equipment by using the first parameter(s) and a first scaling configured by the network device or a second scaling determined by the terminal equipment;

wherein the number of paging occasion(s) configured by the network device is determined by the first parameter(s) and the first scaling configured by the network device or the second scaling determined by the terminal equipment.

9. The apparatus according to supplement 7 or 8, wherein the first parameter(s) include at least one of the following:

a parameter indicating the number of paging occasion(s) associated with a paging frame; and a parameter indicating a first PDCCH monitoring occasion of paging occasion(s).

10. The apparatus according to supplement 8, wherein the apparatus further includes:

a second receiving unit configured to receive second configuration information transmitted by the network device, the second configuration information including the first scaling, and the first determining unit determines indices of the paging occasion of the terminal equipment by using the first parameter and the first scaling.

11. The apparatus according to supplement 8, wherein the apparatus further includes:

a second determining unit configured to determine the second scaling based on a measurement result related interference or load, and the first determining unit determines the index of the paging occasion of the terminal equipment by using the first parameter and the second scaling.

12. The apparatus according to supplement 11, wherein the measurement result related interference or load includes at least one of the following:

a channel occupancy ratio, a channel busy ratio, a rate of success or failure of channel sensing, and a rate of number of times of success or failure of channel sensing.

13. The apparatus according to any one of supplements 7-12, wherein the apparatus further includes:

a third receiving unit configured to receive third configuration information transmitted by the network device, the third configuration information including the maximum number (Y) of paging occasion(s) that the terminal equipment may monitor, and the first determining unit determines an index of a paging occasion of the terminal equipment by using the first parameter and the maximum number (Y).

14. The apparatus according to supplement 13, wherein the first determining unit determines an index of a paging occasion of the terminal equipment according a formula as below:

$$i\_s \bmod (ns/Y) = \mathrm{floor}(UE\_ID/N) \bmod (ns/Y);$$

where, $i\_s$ is an index of the paging occasion of the terminal equipment, ns is the first parameter, Y is the maximum number, UE_ID is identification of the terminal equipment, and N is a total number of paging frames in a DRX cycle of the terminal equipment.

15. The apparatus according to supplement 13, wherein the first determining unit determines an index of a paging occasion of the terminal equipment according a formula as below:

$$(i\_s - n)/Y = \mathrm{floor}(UE\_ID/N) \bmod (ns/Y);$$

where, n is a variable, denoting a sequence number of a paging occasion of the terminal equipment, $i\_s$ is an index of a paging occasion of the terminal equipment, corresponding to the sequence number n, ns is the above first parameter, Y is the above maximum number, UE_ID is identification of the terminal equipment, and N is a total number of paging frames in a DRX cycle of the terminal equipment.

16. The apparatus according to supplement 13, wherein the first determining unit determines indices of the paging occasion of the terminal equipment according a formula as below:

$$i\_s/Y = \mathrm{floor}(UE\_ID/N) \bmod (ns/Y);$$

$$i\_s + n i\_s + 1 + (n-1)*(ns/Y);$$

where, $i\_s+1$ is an index of a first paging occasion of the terminal equipment, $i\_s+1+(n-1)*(ns/Y)$ is an index of the n-th paging occasion of the terminal equipment, ns is the first parameter, Y is the maximum number, n<=Y, UE_ID is identification of the terminal equipment, and N is a total number of paging frames in a DRX cycle of the terminal equipment.

17. The apparatus according to supplement 13, wherein the first determining unit determines indices of the paging occasion of the terminal equipment according a formula as below:

$$i\_s/Y = \mathrm{floor}(UE\_ID/N) \bmod (ns/Y);$$

$$i\_s + n;$$

where, $i\_s$ is an index of a first paging occasion of the terminal equipment, $i\_s+n$ is an index of an n-th paging occasion of the terminal equipment, ns is the first parameter, Y is the maximum number, n<=Y, UE_ID is identification of the terminal equipment, and N is a total number of paging frames in a DRX cycle of the terminal equipment.

18. The apparatus according to any one of supplements 7-17, wherein the apparatus further includes:

a monitoring unit configured to stop monitoring for paging when paging is received or the network device indicates to stop monitoring for paging or all paging occasions are monitored, or configured to monitor paging on all paging occasions that are able to be monitored.

19. The apparatus according to any one of supplements 7-18, wherein the number of the indices of the paging occasion(s) of the terminal equipment is at least one, and when the number of the indices of the paging occasion(s) of the terminal equipment is at least two, the indices of the paging occasion(s) of the terminal equipment are discrete or centralized in time domain.

20. The apparatus according to any one of supplements 7-19, wherein the apparatus is applicable to an NR-based unlicensed spectrum (NR-U).

1B. An apparatus for configuring and determining paging opportunities, configured in a network device, the apparatus including:

a generating unit configured to generate fourth configuration information, the fourth configuration information including second parameter(s) associated with paging occasion(s), a paging occasion associated with the second parameter(s) including a first number of downlink control channel monitoring occasions or a second number of sets of downlink control channel monitoring occasions, the first number being related to synchronization signal blocks (SSBs); and a first transmitting unit configured to transmit the fourth configuration information.

2B. The apparatus according to supplement 1B, wherein in a case where the paging occasion associated with the second parameter(s) includes a first number of downlink control channel monitoring occasions, the first number is at least one of the following:

the number (S) of actually transmitted SSBs determined according to information provided in a first system information block (SIB1), multiples (xS) of the number of actually transmitted SSBs (S) determined according to information provided in a first system information block (SIB1), a number (S') determined according to the number of SSBs that is determined according to information provided by a network, and multiples (xS') of a number determined according to the number of SSBs that is determined according to information provided by a network.

3B. The apparatus according to supplement 1B, wherein in a case where the paging occasion associated with the second parameter(s) includes a second number of sets of downlink control channel monitoring occasions, the second parameter(s) includes at least one of the following:

a value of a second number of starting PDCCH monitoring occasions of a paging occasion, and a second number of values of a starting PDCCH monitoring occasion of a paging occasion;

wherein in the time domain, the sets of PDCCH monitoring occasions are associated with different paging occasions in a centralized way, or the sets of PDCCH monitoring occasions are sequentially associated with different paging occasions in a discrete way.

4B. The apparatus according to supplement 1B, wherein in a case where the paging occasion associated with the second parameter(s) includes a second number of sets of downlink control channel monitoring occasions, the apparatus further includes:

a second transmitting unit configured to transmit fifth configuration information to the terminal equipment, the fifth configuration information including intervals between the second number of sets of downlink control channel monitoring occasions within the paging occasion associated with the second parameter(s).

5B. The apparatus according to supplement 4B, wherein the apparatus further includes:

a third transmitting unit configured to transmit sixth configuration information to the terminal equipment, the sixth configuration information being configured with the second number.

6B. The apparatus according to any one of supplements 1B-5B, wherein durations of all the downlink control channels are greater than or equal to 4 symbols.

7B. The apparatus according to any one of supplements 1B-5B, wherein a duration of at least one downlink control channel monitoring occasion within one paging occasion associated with the second parameter(s) is greater than or equal to 4 symbols.

8B. The apparatus according to any one of supplements 1B-7B, wherein the apparatus further includes:

a fourth transmitting unit configured to transmit third configuration information to the terminal equipment, the third configuration information including a maximum number (Y) of paging occasion(s) that the terminal equipment may monitor, and indices of paging occasion(s) of the terminal equipment are determined at least by the maximum number (Y).

9B. The apparatus according to any one of supplements 1B-8B, wherein the apparatus is applicable to an NR-based unlicensed spectrum (NR-U).

10B. An apparatus for configuring and determining paging opportunities, configured in a terminal equipment, the apparatus including:

a first receiving unit configured to receive fourth configuration information transmitted by a network device, the fourth configuration information including second parameter(s) associated with paging occasion(s), a paging occasion associated with the second parameter(s) including a first number of downlink control channel monitoring occasions or a second number of sets of downlink control channel monitoring occasions, the first number being related to synchronization signal blocks (SSBs); and a determining unit configured to determine paging opportunities of the terminal equipment by using the second parameter(s).

11B. The apparatus according to supplement 10B, wherein in a case where the paging occasion associated with the second parameter(s) includes the first number of downlink control channel monitoring occasions, the first number is at least one of the following:

the number (S) of actually transmitted SSBs determined according to information provided in a first system information block (SIB1);

multiples (xS) of the number of actually transmitted SSBs determined according to information provided in a first system information block (SIB1);

a number (S') determined according to the number of SSBs that is determined according to information provided by a network; and multiples (xS') of a number determined according to the number of SSBs that is determined according to information provided by a network.

12B. The apparatus according to supplement 10B, wherein in a case where the paging occasion associated with the second parameter(s) includes the second number of sets of downlink control channel monitoring occasions, the second parameter(s) include at least one of the following:

values of a second number of starting downlink control channel monitoring occasions of a paging occasion; and a second number of values of one starting downlink control channel monitoring occasion of a paging occasion;

wherein in the time domain, the sets of downlink control channel monitoring occasion sets are associated with different paging occasions in a centralized way, or the sets of downlink control channel monitoring occasions are sequentially associated with different paging occasions in a discrete way.

13B. The apparatus according to supplement 10B, wherein the apparatus further includes:
a second receiving unit configured to receive fifth configuration information transmitted by the network device, the fifth configuration information including intervals between a second number of sets of downlink control channel monitoring occasions within a paging occasion associated with the second parameter(s),
and the determining unit determines paging opportunities of the terminal equipment by using the second parameter(s) and the intervals.

14B. The apparatus according to supplement 13B, wherein the apparatus further includes:
a third receiving unit configured to receive sixth configuration information transmitted by the network device, the sixth configuration information including the second number,
and the determining unit determines paging opportunities of the terminal equipment by using the second parameter(s), the second number and the intervals.

15B. The apparatus according to supplement 10B, wherein,
the determining unit determines a position of a starting downlink control channel monitoring occasion of a first paging occasion of the terminal equipment by using the second parameter(s).

16B. The apparatus according to supplement 15B, wherein the apparatus further includes:
a fourth receiving unit configured to receive third configuration information transmitted by the network device, the third configuration information including the maximum number (Y) of paging occasion(s) that are able to be monitored by the terminal equipment,
and the determining unit determines the position of the starting downlink control channel monitoring occasion of a first paging occasion of the terminal equipment by using the second parameter(s) and the maximum number (Y).

17B. The apparatus according to supplement 16B, wherein the determining unit determines the position according to a relationship as below:
the number of the starting downlink control channel monitoring occasions mod p=an (i_s+1)-th value of firstPDCCH-MonaoringOccasionOfPO;
where, p=ns/Y, i_s+1 is the positions of the starting downlink control channel monitoring occasions of the first paging occasion of the terminal equipment, ns and firstPDCCH-MonaoringOccasionOfPO are the second parameter(s), and Y is the maximum number.

18B. The apparatus according to supplement 10B, wherein a duration of at least one downlink control channel monitoring occasion within at least one paging occasion associated with the second parameter(s) is greater than or equal to four symbols.

19B. The apparatus according to any one of supplements 10B-18B, wherein the apparatus further includes:
a monitoring unit configured to stop monitoring for paging when paging is received or the network device indicates to stop monitoring for paging or all paging occasions are monitored, or configured to monitor paging on all paging occasions that are able to be monitored.

1C. An apparatus for configuring and determining paging opportunities, configured in a network device, the apparatus including:
a generating unit configured to generate seventh configuration information, the seventh configuration information including third parameter(s) associated with DRX cycles, the third parameter(s) being associated with one or more DRX cycles, and the DRX cycles being used for a terminal equipment to access to an NR-based unlicensed spectrum or for a terminal equipment to be provided with services by an NR-based unlicensed spectrum; and
a first transmitting unit configured to transmit the seventh configuration information to the terminal equipment.

2C. The apparatus according to supplement 1C, wherein the third parameter(s) is/are identical to or different from parameters associated with a DRX cycle and based on an NR licensed spectrum, and values of the third parameter(s) are smaller than values of the parameters associated with a DRX cycle and based on an NR licensed spectrum.

3C. The apparatus according to supplement 1C, wherein the third parameter(s) is/are associated with two DRX cycles, and time-domain lengths of the at least two DRX cycles are different.

4C. The apparatus according to supplement 3C, wherein the apparatus further includes:
a second transmitting unit configured to transmit first indication information to the terminal equipment, the first indication information indicating one of the two DRX cycles, and the terminal equipment uses the DRX cycle indicated by the first indication information to access to the NR-based unlicensed spectrum or is served by the NR-based unlicensed spectrum.

5C. The apparatus according to supplement 3C, wherein the apparatus further includes:
a third transmitting unit configured to transmit second indication information to the terminal equipment, the second indication information configuring or activating a rule switching over between the above two DRX cycles and/or determining parameters for switching over between the two DRX cycles.

6C. The apparatus according to supplement 5C, wherein the rule includes at least one of the following:
a timer-based rule,
a counter-based rule,
and a threshold-based rule.

7C. The apparatus according to supplement 6C, wherein,
the timer-based rule refers to switching over to another DRX cycle when a timer associated with one DRX cycle expires;
the counter-based rule refers to switching over to another DRX cycle when the number of times of using a DRX cycle reaches a maximum value;
and the threshold-based rule refers to that it is switched over to another DRX cycle when a channel measurement result of a DRX cycle exceeds or is less than a threshold.

8C. The apparatus according to supplement 5C, wherein the parameter includes at least one of the following:
values of timers associated with a timer-based rule;
a maximum value of a DRX cycle associated with a counter-based rule; and
a threshold associated with a threshold-based rule.

9C. The apparatus according to supplement 1C, wherein values of the one or more DRX cycles are defined in the Standards.

10C. An apparatus for configuring and determining paging opportunities, configured in a terminal equipment, the apparatus including:

a first receiving unit configured to receive seventh configuration information transmitted by a network device, the seventh configuration information being configured with third parameter(s) associated with DRX cycles, the third parameter(s) being associated with one or more DRX cycles; and a processing unit configured to access to an NR-based unlicensed spectrum or to be provided with services by an NR-based unlicensed spectrum according to the one or more DRX cycles.

11C. The apparatus according to supplement 10C, wherein the third parameter(s) is/are identical to or different from parameters associated with a DRX cycle and based on an NR licensed spectrum, and values of the third parameter(s) are smaller than values of the parameters associated with a DRX cycle and based on an NR licensed spectrum.

12C. The apparatus according to supplement 10C, wherein the third parameter(s) is/are associated with two DRX cycles, and time-domain lengths of the at least two DRX cycles are different.

13C. The apparatus according to supplement 12C, wherein, the processing unit decides to use one of the two DRX cycles to determine the paging occasion(s) according to energy consumption or paging occasion(s) of the terminal equipment.

14C. The apparatus according to supplement 12C, wherein the apparatus further includes:

a second receiving unit configured to receive first indication information transmitted by the network device, the first indication information indicating one of the two DRX cycles, and the processing unit accesses to the NR-based unlicensed spectrum or is provided with services by the NR-based unlicensed spectrum by using the DRX cycle indicated by the first indication information;

and the processing unit determines the paging occasion(s) by using the DRX cycle indicated by the first indication information.

15C. The apparatus according to supplement 12C, wherein the apparatus further includes:

a third receiving unit configured to receive second indication information transmitted by the network device, the second indication information configuring or activating a rule for switching over between the two DRX cycles and/or determining a parameter for switching over between the two DRX cycles;

and the processing unit, according the rule and/or the parameter, makes the terminal equipment switch over between the two DRX cycles, and determines the paging occasion(s) of the terminal equipment according to a determined DRX cycle.

16C. The apparatus according to supplement 15C, wherein the rule includes at least one of the following:
a timer-based rule,
a counter-based rule,
and a threshold-based rule.

17C. The apparatus according to supplement 16C, wherein, if the rule is the timer-based rule, when a timer with which a DRX cycle is associated expires, the terminal equipment switches over to another DRX cycle;

if the rule is the counter-based rule, when the number of times of using a DRX cycle reaches a maximum value, the terminal equipment switches over to another DRX cycle;

and if the rule is the threshold-based rule, when a channel measurement result of a DRX cycle exceeds a threshold, the terminal equipment switches to another DRX cycle.

18C. The apparatus according to supplement 15C, wherein the parameter includes at least one of the following:
values of timers associated with a timer-based rule;
a maximum value of a DRX cycle associated with a counter-based rule; and
a threshold associated with a threshold-based rule;
and the terminal equipment switches over between the at least two DRX cycles according to the parameter and the rule, and determines the paging occasion(s) of the terminal equipment according to a determined DRX cycle.

What is claimed is:

1. An apparatus for configuring and determining paging opportunities, configured in a terminal equipment, the apparatus comprising:
    a first receiving unit configured to receive fourth configuration information transmitted by a network device, the fourth configuration information comprising second parameter(s) associated with paging occasion(s), a paging occasion associated with the second parameter(s) comprising a first number of downlink control channel monitoring occasions or a second number of sets of downlink control channel monitoring occasions, the first number being related to synchronization signal blocks (SSBs); and
    a determining unit configured to determine paging opportunities of the terminal equipment by using the second parameter(s),
    wherein in a case where the paging occasion associated with the second parameter(s) comprises the first number of downlink control channel monitoring occasions, the first number is at least one of the following;
    the number (S) of actually transmitted SSBs determined according to information prvided in a first system information block (SIB1);
    multiples (S) of the number of actually transmitted SSBs determined according to information provided in a first system information block (SIB1);
    a number (S') determined according to the number of SSBs that is determined according to information provided by a network; and
    multiples (xS') of a number determined according to the number of SSBs that is determined according to information provided by a network.

2. The apparatus according to claim 1, wherein in a case where the paging occasion associated with the second parameter(s) comprises the second number of sets of downlink control channel monitoring occasions, the second parameter(s) comprise at least one of the following:
    values of a second number of starting downlink control channel monitoring occasions of a paging occasion; and
    a second number of values of one starting downlink control channel monitoring occasion of a paging occasion;
    wherein in the time domain, the sets of downlink control channel monitoring occasion sets are associated with different paging occasions in a centralized way, or the sets of downlink control channel monitoring occasions are sequentially associated with different paging occasions in a discrete way.

3. The apparatus according to claim 1, wherein,
    the determining unit determines positions of starting downlink control channel monitoring occasions of a first paging occasion of the terminal equipment by using the second parameter(s).

4. The apparatus according to claim 3, wherein the apparatus further comprises:

a fourth receiving unit configured to receive third configuration information transmitted by the network device, the third configuration information comprising the maximum number (Y) of paging occasion(s) that are able to be monitored by the terminal equipment;

and the determining unit determines the positions of the starting downlink control channel monitoring occasions of the first paging occasion of the terminal equipment by using the second parameter(s) and the maximum number (Y).

5. The apparatus according to claim 4, wherein the determining unit determines the positions according to a relationship as below:

the number of the starting downlink control channel monitoring occasions mod p=an (i_s+1)-th value of firstPDCCH-MonitoringOccasionOfPO;

where, p=ns/Y, i_s+1 is the positions of the starting downlink control channel monitoring occasions of the first paging occasion of the terminal equipment, ns and firstPDCCH-MonitoringOccasionOfPO are the second parameter(s), and Y is the maximum number.

6. The apparatus according to claim 1, wherein a duration of at least one downlink control channel monitoring occasion within at least one paging occasion associated with the second parameter(s) is greater than or equal to 4 symbols.

7. The apparatus according to claim 1, wherein the apparatus further comprises:

a monitoring unit configured to stop monitoring for paging when paging is received or the network device indicates to stop monitoring for paging or all paging occasions are monitored, or configured to monitor paging on all paging occasions that are able to be monitored.

8. An apparatus for configuring and determining paging opportunities, configured in a terminal equipment, the apparatus comprising:

a receiving unit configured to receive first configuration information transmitted by a network device, the first configuration information comprising first parameter(s) associated with paging occasion(s), and the number of the paging occasion(s) associated with the first parameter(s) being greater than 4 and being an integral multiple of 4; and a determining unit configured to determine indices of paging occasion(s) of the terminal equipment by using the first parameter(s).

9. The apparatus according to claim 8, wherein the first parameter(s) comprise at least one of the following:

a parameter indicating the number of paging occasion(s) associated with a paging frame; and a parameter indicating a first downlink control channel (PDCCH) monitoring occasion of paging occasion(s).

10. The apparatus according to claim 8, wherein apparatus further comprises:

a third receiving unit configured to receive third configuration information transmitted by the network device, the third configuration information comprising the maximum number (Y) of paging occasion(s) that are able to be monitored by the terminal equipment;

and the determining unit determines indices of paging occasion(s) of the terminal equipment by using the first parameter(s) and the maximum number (Y).

11. The apparatus according to claim 10, wherein determining unit determines the indices of paging occasion(s) of the terminal equipment according a formula as below:

$i\_s \bmod (ns/Y) = \mathrm{floor}(UE\_ID/N) \bmod (ns/Y)$;

where, i_s is an index of a paging occasion of the terminal equipment, ns is the first parameter, Y is the maximum number, UE_ID is identification of the terminal equipment, and N is a total number of paging frames in a discontinuous reception (DRX) cycle of the terminal equipment.

12. The apparatus according to claim 10, wherein the determining unit determines the indices of paging occasion(s) of the terminal equipment according a formula as below:

$i\_s/Y = \mathrm{floor}(UE\_ID/N) \bmod (ns/Y)$;

i_s+n;

where, i_s is an index of a first paging occasion of the terminal equipment, i_s+n is an index of an n-th paging occasion of the terminal equipment, ns is the first parameter, Y is the maximum number, $n<=Y$, UE_ID is identification of the terminal equipment, and N is a total number of paging frames in a DRX cycle of the terminal equipment.

13. The apparatus according to claim 8, wherein the apparatus further comprises:

a monitoring unit configured to monitor paging on a part of paging occasions that are able to be monitored, until paging is received or the network device indicates to stop monitoring or all paging occasions are monitored, or configured to monitor paging on all paging occasions that are able to be monitored.

14. The apparatus according to claim 8, wherein the number of the indices of paging occasion(s) of the terminal equipment is at least one, and when the number of the indices of paging occasion(s) of the terminal equipment is at least two, the indices of paging occasion(s) of the terminal equipment are discrete or centralized in time domain.

15. An apparatus for configuring and determining paging opportunities, configured in a terminal equipment, the apparatus comprising:

a first receiving unit configured to receive seventh configuration information transmitted by a network device, the seventh configuration information being configured with third parameter(s) associated with DRX cycles, the third parameter(s) being associated with one or more DRX cycles; and a processing unit configured to access to an NR-based unlicensed spectrum or to be provided with services by an NR-based unlicensed spectrum according to the one or more DRX cycles.

16. The apparatus according to claim 15, wherein the third parameter(s) is/are associated with two DRX cycles, time-domain lengths of the two DRX cycles being different.

17. The apparatus according to claim 16, wherein the apparatus further comprises:

a second receiving unit configured to receive first indication information transmitted by the network device, the first indication information indicating one of the two DRX cycles, and the processing unit accesses to the NR-based unlicensed spectrum or is provided with services by the NR-based unlicensed spectrum by using the DRX cycle indicated by the first indication information;

and the processing unit determines the paging occasion(s) by using the DRX cycle indicated by the first indication information.

18. The apparatus according to claim 16, wherein the apparatus further comprises:

a third receiving unit configured to receive second indication information transmitted by the network device, the second indication information configuring or activating a rule for switching over between the two DRX cycles and/or determining a parameter for switching over between the two DRX cycles;

and the processing unit, according to the rule and/or the parameter, makes the terminal equipment switch over between the two DRX cycles, and determines the paging occasion(s) of the terminal equipment according to a determined DRX cycle.

19. The apparatus according to claim 18, wherein the parameter comprises at least one of the following:

values of timers associated with a timer-based rule;

a maximum value of a DRX cycle associated with a counter-based rule; and a threshold associated with a threshold-based rule;

and the terminal equipment switches over between the at least two DRX cycles according to the parameter and the rule, and determines the paging occasion(s) of the terminal equipment according to a determined DRX cycle.

* * * * *